(12) United States Patent
Morris et al.

(10) Patent No.: US 12,547,647 B2
(45) Date of Patent: *Feb. 10, 2026

(54) UNSUPERVISED MACHINE LEARNING SYSTEM TO AUTOMATE FUNCTIONS ON A GRAPH STRUCTURE

(71) Applicant: Bank of America Corporation, Charlotte, NC (US)

(72) Inventors: Ronnie J. Morris, Mesquite, TX (US); Dana M. Pusey-Conlin, Wilmington, DE (US); Lorraine C. Edkin, Jacksonville, FL (US); Scott A. Sims, Tega Cay, SC (US); Joel Filliben, Newark, DE (US); Margaret A. Payne, Elkton, MD (US); Craig Douglas Widmann, Chandler, AZ (US); Eren Kursun, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 131 days.

This patent is subject to a terminal disclaimer.

(21) Appl. No.: 18/207,861

(22) Filed: Jun. 9, 2023

(65) Prior Publication Data
US 2023/0316076 A1 Oct. 5, 2023

Related U.S. Application Data

(63) Continuation of application No. 16/006,559, filed on Jun. 12, 2018, now Pat. No. 11,710,033.

(51) Int. Cl.
*G06F 16/28* (2019.01)
*G06F 16/22* (2019.01)

(52) U.S. Cl.
CPC ........ *G06F 16/288* (2019.01); *G06F 16/2291* (2019.01)

(58) Field of Classification Search
None
See application file for complete search history.

(56) References Cited

U.S. PATENT DOCUMENTS

| | | |
|---|---|---|
| 6,961,734 B2 | 11/2005 | Kauffman |
| 7,171,557 B2 | 1/2007 | Kallahalla et al. |
| 7,562,814 B1 | 7/2009 | Shao et al. |
| 7,720,882 B2 | 5/2010 | Liu et al. |
| 7,836,065 B2 | 11/2010 | Hackmann |

(Continued)

OTHER PUBLICATIONS

"1.11. Ensemble Methods", Scikit learn, date unknown, retrieved from internet May 2, 2018, URL: http://scikit-learn.org/stable/modules/ensemble.html, 20 pp.

(Continued)

*Primary Examiner* — Vincent Gonzales
(74) *Attorney, Agent, or Firm* — Banner & Witcoff, Ltd.

(57) ABSTRACT

Machine learning models, semantic networks, adaptive systems, artificial neural networks, convolutional neural networks, and other forms of knowledge processing systems are disclosed. An ensemble machine learning system is coupled to a graph module storing a graph structure, wherein a collection of entities and the relationships between those entities forms nodes and connection arcs between the various nodes. A hotfile module and hotfile propagation engine coordinate with the graph module or may be subsumed within the graph module, and implement the various hot file functionality generated by the machine learning systems.

13 Claims, 10 Drawing Sheets

(56) References Cited

U.S. PATENT DOCUMENTS

| | | | |
|---|---|---|---|
| 7,908,645 | B2 | 3/2011 | Varghese et al. |
| 8,005,842 | B1 | 8/2011 | Pasca et al. |
| 8,010,454 | B2 | 8/2011 | Engel et al. |
| 8,037,113 | B2 | 10/2011 | Bisht |
| 8,086,638 | B1 | 12/2011 | Stacey et al. |
| 8,296,301 | B2 | 10/2012 | Lunde |
| 8,296,312 | B1 | 10/2012 | Leung et al. |
| 8,316,008 | B1 | 11/2012 | Kohli |
| 8,700,684 | B2 | 4/2014 | Kim et al. |
| 8,762,298 | B1 | 6/2014 | Ranjan et al. |
| 9,087,088 | B1 | 7/2015 | Bose et al. |
| 9,113,001 | B2 | 8/2015 | Rajakumar et al. |
| 9,547,651 | B1 | 1/2017 | Ahmed et al. |
| 9,747,644 | B2 | 8/2017 | Cowen et al. |
| 10,009,358 | B1 | 6/2018 | Xie et al. |
| 10,628,826 | B2 | 4/2020 | Yu et al. |
| 2005/0024398 | A1 | 2/2005 | Kanamaru |
| 2007/0174214 | A1 | 7/2007 | Welsh et al. |
| 2010/0169137 | A1 | 7/2010 | Jastrebski et al. |
| 2011/0022483 | A1 | 1/2011 | Hammad |
| 2012/0226590 | A1 | 9/2012 | Love et al. |
| 2016/0307115 | A1 | 10/2016 | Wu |
| 2017/0169432 | A1 | 6/2017 | Arvapally et al. |
| 2018/0113899 | A1 | 4/2018 | Htun et al. |
| 2018/0150572 | A1 | 5/2018 | Yates et al. |
| 2018/0330258 | A1 | 11/2018 | Harris et al. |
| 2021/0027182 | A1 | 1/2021 | Harris et al. |

OTHER PUBLICATIONS

"A Guide to TF Layers: Building a Convolutional Neural Network", date unknown, retrieved from internet May 2, 2018, URL: https://www.tensorflow.org/tutorials/layers, 17 pp.

"Anomaly Detection Using K-Means Clustering", Jun. 30, 2015, retrieved from internet May 2, 2018, URL: https://anomaly.io/anomaly-detection-clustering/.

"Best of Bai Beacon: Artifical Intelligence", unknown date, retrieved from internet, URL: https://www.bai.org/events/microsites/bai-beacon—2017-archive/about/best-of-bai-beacon-artifical-intelligence, 4 pp.

Avinash, Sharma V., "Understanding Activation Functions in Neural Networks", Mar. 30, 2017, retrieved from internet May 2, 2018, URL: https://medium.com/the-theory-of-everything/understanding-activation-functions-in-neural-networks-9491262884e0, 10 pp.

Barta, Dan, "Fighting Payments Fraud the Hybrid Way", May 9, 2012, 3 pp.

Brownlee, Jason, "A Gentle Introduction to the Gradient Boosting Algorithm for Machine Learning", Sep. 9, 2016, retireved from internet May 2, 2018, URL: https://machinelearningmastery.com/gentle-inttroduction-gradient-boosting-algorithm-machine-learning/.

Brownlee, Jason, "Ensemble Machine Learning Algorithms in Python With Scikit-Learn", Jun. 3, 2016, retrieved from internet May 2, 2018, URL: https://machinelearningmastery.com/ensemble-machine-learning-algorithms-python-scikit-learn, 31 pp.

Brownlee, Jason, "Gentle Introduction to the Adam Optimization Algorithm for Deep Learning", Jul. 3, 2017, retrieved from internet May 2, 2018, URL: https://machinelearningmastery.com/adam-optimization-algorithm-for-deep-learning.

Frans, Kevin, "Variational Autoencoders Explained", Aug. 6, 2016, retrieved from internet May 8, 2018, URL: http://kvfrans.com/variational-autoencoders-explained/.

Glander, Shirin, "Autoencoders and Anomaly Detection With Machine Learning in Fraud Analytics", May 1, 2017, retrieved from internet May 2, 2018, URL: https://shiring.github.io/machine_learning/2017/05/01/fraud, 27 pp.

Gorman, Ben, "No Free Hunch, a Kaggler's Guide to Model Stacking in Practice", Dec. 27, 2016.

Gulshan, Varun et al., "Development and Validation of a Deep Learning Algorithm for Detection of Diabetic Reintopathy in Retinal Fundus Photographs", JAMA, Dec. 13, 2016, vol. 316, No. 22, p. 2402-2410.

Lyudchik, Olga, "Outlier Detection Using Autoencoders", Cern non-member state, summer student report, Aug. 19, 2016.

Patil, DJ, "Data Jujitsu", copyright 2012, published by OReilly Media, Inc., 29pp.

Ruder, Sebastian, An Overview of Gradient Descent Optimization Algorithms, Jan. 19, 2016, retrieved from internet May 2, 2018, URL: http://ruder.io/optimizing-gradient-descent/, 38 pp.

Shahreza, M. Lotfi et al., "Anomaly Detection Using a Self-Organizing Map and Particle Swarm Optimization", Scientia Iranica, Jan. 18, 2011, 18(6), pp. 1460-1468.

Smolykov, Vadim, "Ensemble Learning to Improve Machine Learning Results", Aug. 22, 2017, retrieved from internet May 2, 2018, URL: https://blog.statsbot.co/ensemble-learning-d'dcd54e936.

Wikipedia, "Ensemble Learning", unknown date, retrieved from internet May 2, 2018, URL: https://en.wikipedia.org/wiki/Ensemble_learning, 7 pp.

Wikipedia, "Feature Engineering", unknown date, retrieved from internet Apr. 24, 2018, URL: https://en.wikipedia.org/wiki/Feature_engineering, 3 pp.

Wikipedia, "Self-Organizing Map", unknown date, retrieved from internet Feb. 27, 2018, URL: https://en.wikipedia.org/wiki/Self-organizing_map, 8 pp.

Van Vlasselaer, Veronique, et al. "Gotcha! Network-based fraud detection for social security fraud." Management Science 63.9 (2017): 3090-3110. (Year: 2017).

McGlohon, Mary, et al. "Snare: a link analylic system for graph labeling and risk detection." Proceedings of the 15th ACM SIGKDD international conference on Knowledge discovery and data mining. 2009. (Year: 2009).

Zhan et al., "A Loan Application Fraud Detection Method Based on Knowledge Graph and Neural Network," Mar. 2018, ICIAI, Assocation for Computing Machinery, pp. 111-115 (Year: 2018).

Tselykh et al., "Web Service for Detecting Credit Card Fraud in Near Real-Time," Sep. 2015, SIN '15, ACM, 4 pag (Year: 2015).

Akoglu et al., "Graph-based Anomaly Detection and Description: A Survey," Apr. 28, 2014, arXiv:1404.4679v2 [cs.SI], pp. 1-68 (Year: 2014).

Monamo et al., "Unsupervised Learning for Robust Bitcoin Detection," 2016, IEEE, pp. 129-134 (Year: 2016).

Apr. 26, 2022—U.S. Advisory Action—U.S. Appl. No. 16/006,285.

Olszewski D. "Fraud detection using self-organizing map visualizing the user profiles. Knowledge-Based Systems.", Nov. 1, 2014 ;70: 324-34. (Year 2014).

Shahreza ML, et al. "Anomaly detection using a self-organizing map and particle swarm optimization.", Scientia Irani ca. Dec. 1, 2011; 18(6): 1460-8. (Year: 2011).

Zaslavsky V, et al. "A. Credit card fraud detection using self-organizing maps. Information and Security." Jan. 2006; 18:48. (Year: 2006).

May 25, 2022—U.S. Non-Final Office Action—U.S. Appl. No. 16/006,559.

Tuyls, K. et al., "Machine Learning Techniques for Fraud Detection" (Year: 2015).

Malini, N. et al., "Analysis on credit card fraud identification techniques based on KNN and outlier detection", 2017 Third International Conference on Advances in Electrical, Electronics, Information, Communication and Bio-Informatics (AEEICB), 2017, pp. 255-258 (Year. 2017).

Low, Y. et al., "Distributed Graph Lab: A Framework for Machine Learning and Data Mining in the Cloud" (Year: 2012).

Mar. 13, 2023—U.S. Notice of Allowance—U.S. Appl. No. 16/006,559.

UNSUPERVISED MACHINE LEARNING SYSTEM TO AUTOMATE FUNCTIONS ON A GRAPH STRUCTURE

CROSS-REFERENCE TO RELATED APPLICATIONS

This application claims the benefit of and is a continuation of U.S. application Ser. No. 16/006,559, filed Jun. 12, 2018. The above application is incorporated by reference herein in its entirety.

TECHNICAL FIELD

This disclosure pertains to machine learning models, semantic networks, adaptive systems, artificial neural networks, convolutional neural networks, and other forms of knowledge processing systems. An ensemble machine learning system is coupled to a graph structure, wherein a collection of entities and the relationships between those entities forms nodes and connection arcs between the various nodes.

BACKGROUND

Machine learning has enabled the automated processing of problems formerly limited to human intervention. Traditionally, computers have been explicitly programmed to perform tasks, meaning that even fairly simple tasks can take significant amounts of programming time to implement. Machine learning may be used to allow a computer to perform the same or similar tasks without being explicitly programmed to do so. For example, where formerly a programmer may have manually programmed a face detection algorithm (e.g., providing code telling a computer to look for two eyes, a nose, and a mouth), machine learning may be used instead by providing a computer with a large set of pictures of human faces (e.g., some winking, some smiling, some partially obscured) and rewarding the computer for correct identifications of human faces over repeated trials. Colloquially, such methods may be said to allow a machine learning algorithm to both think and learn.

Machine learning has benefits far beyond programming efficiency: machines may also learn and identify correlations in data that would otherwise go undetected if reviewed by humans. For example, a video game company may know that players are likely to play video games during weekends, but may be unable to determine a formerly unknown correlation between weather (e.g., the cold and/or amount of snow) and the number of players on a game at any given time. While a human would be unlikely to detect such a correlation given the volume of data involved and a lack of a motivation to compare such datasets, a machine learning algorithm may do so largely without human intervention.

Machine learning algorithms are asked to label data in large data sets. For example, a machine learning algorithm may be asked to label a face in a photograph, or to indicate the presence or absence of a face in an entire photo. Other forms of machine learning algorithm output have been implemented. For example, a machine learning algorithm may be asked to make future predictions based on current data, may be asked to group data, may be asked to determine human-language responses to queries, or the like.

Machine learning is of increasing interest in fields where significant human time and subjective decision-making is otherwise necessary. Many voice-controlled artificial intelligence ("AI") systems rely on machine learning to better understand spoken words and phrases. While human-programmed voice recognition systems have existed previously, machine learning algorithms allow for the rapid adaptation of voice-controlled AI systems to handle, for example, poorly spoken words and colloquialisms. Machine learning can even be used for areas of subjective taste. For example, some entities use uses machine learning to improve its video recommendation engine. While programming a video recommendation engine by hand is possible (e.g., one that recommends action movies if a user watches many action movies), machine learning algorithms have proven particularly adept at identifying and acting on user preferences that are not easily predicted.

Machine learning is still nascent in many fields, and the integration of its capabilities still leaves much room for improvement. In particular, there is little in the way of an ensemble machine learning system coupled to a graph structure that has a collection of entities/nodes and relationships/edges between those entities.

SUMMARY

The following summary presents a simplified summary of certain features. The summary is not an extensive overview and is not intended to identify key or critical elements.

In a first embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a machine learning system that optimizes a feature vector, the system including: a first interface configured to receive transaction data; a graph module configured to store and update a graph using the transaction data, the graph including nodes and edges, where each node corresponds to an entity type, and where each edge represents a relationship between two nodes; and a machine learning engine including a plurality of machine learning sub-engines, where each entity type in the graph is assigned a separate machine learning sub-engine, the machine learning engine is programmed to perform steps including: training a machine learning model of a machine learning sub-engine of the machine learning engine using the transaction data; classifying a plurality of nodes in the graph based on known patterns in the transaction data and the machine learning model, by setting a classification attribute of each node to one of a plurality of classifications; detecting, by the machine learning sub-engine, an emerging pattern between a first node and second node in the graph based on the transaction data; inserting an edge between the first node and the second node in the graph in response to the detecting of the emerging pattern; and adjusting the feature vector based on an objective function to minimize a loss function. Other embodiments of this aspect include corresponding computer systems, apparatus, and computer programs recorded on one or more computer storage devices, each configured to perform the actions of the methods.

Implementations may include one or more of the following features. The system where the machine learning engine including a plurality of machine learning sub-engines is an ensemble, where the first node is a first entity type and the second node is not the first entity type, and where the machine learning sub-engine is assigned to the first node and is different than a machine learning sub-engine assigned to the second node. The system where the ensemble includes a graphics processing unit. The system where the ensemble includes a semi-supervised machine learning engine. The system where the first node stored by the graph module corresponds to a device entity type and the second node stored by the graph module corresponds to a customer entity type, and where the edge inserted between the first node and the second node is in response to the ensemble detecting the emerging pattern between a customer's smartphone device and fraud. The system where the classifying of the first node in the graph includes populating a confidence attribute of the first node, based on the machine learning model. The system where the machine learning model corresponds to the machine learning sub-engine assigned to the entity type of the first node. The system where the adjusting the feature vector includes adding a feature to the feature vector. The system where the feature is a hardware identifier assigned to a device originating the transaction data received by the first interface. The system where the feature is one of: a phone number corresponding to a device originating the transaction data received by the first interface, a unique identifier assigned to a cookie corresponding to the transaction data, an email address, and a screen resolution of the device. The system where the adjusting the feature vector includes removing a feature from the feature vector. The system the system further including: a user computing device configured to originate the transaction data received by the first interface, where the transaction data includes a hardware identifier assigned to the user computing device, a phone number corresponding to the user computing device, a unique identifier assigned to a cookie corresponding to the transaction data, an email address, and a screen resolution of the user computing device. The system the system further including: a historical data store communicatively coupled to the graph module, where the historical data store includes historical transaction data corresponding to the plurality of nodes. The system where the graph module, in response to receiving a current event data, is configured to set the classification attribute of the first node to a value predicted by the machine learning engine. The system where the current event data includes at least one of: new transaction data, a report of a stolen card, an uninstallation of a software application from a device, and an installation of a software application onto a device. The system where the graph module is configured to update a confidence attribute of the first node based on the machine learning model that detected the emerging pattern. The apparatus where each entity type in the graph is assigned a separate machine learning sub-engine, and where a first machine learning sub-engine of the ensemble of machine learning sub-engines is a neural network, and where a second machine learning sub-engine of the ensemble of machine learning sub-engines is a Boltzmann machine, and where a third machine learning sub-engine of the ensemble of machine learning sub-engines is a restricted Boltzmann machine, and where a fourth machine learning sub-engine of the ensemble of machine learning sub-engines is an autoencoder. The non-transitory computer readable medium where the first entity type is a device entity type and the second entity type is a customer entity type, and where the edge inserted linking the first node to the second node is in response to the ensemble detecting a smartphone device corresponding to the first node is associated with a fraudulent transaction reported by a customer corresponding to the second node. Implementations of the described techniques may include hardware, a method or process, or computer software on a computer-accessible medium.

One general aspect includes an apparatus including: a first interface configured to receive transaction data; a graph module configured to store and update a graph using the transaction data, the graph including nodes and edges, where each node corresponds to an entity type, and where each edge represents a relationship between two nodes; and an ensemble of machine learning sub-engines programmed to perform steps including: training a machine learning model of a machine learning sub-engine of the ensemble using a corpus, where the corpus includes a training data and a test data; classifying a plurality of nodes in the graph based on the machine learning model, by setting a classification attribute of a first node and a second node of the plurality of nodes to one of a plurality of classifications; and inserting an edge in the graph between the first node and the second node in response to the machine learning model detecting a pattern. Other embodiments of this aspect include corresponding computer systems, apparatus, and computer programs recorded on one or more computer storage devices, each configured to perform the actions of the methods.

Implementations may include one or more of the following features. The apparatus where each entity type in the graph is assigned a separate machine learning sub-engine, and where a first machine learning sub-engine of the ensemble of machine learning sub-engines is a neural network, and where a second machine learning sub-engine of the ensemble of machine learning sub-engines is a Boltzmann machine, and where a third machine learning sub-engine of the ensemble of machine learning sub-engines is a restricted Boltzmann machine, and where a fourth machine learning sub-engine of the ensemble of machine learning sub-engines is an autoencoder. The non-transitory computer readable medium where the first entity type is a device entity type and the second entity type is a customer entity type, and where the edge inserted linking the first node to the second node is in response to the ensemble detecting a smartphone device corresponding to the first node is associated with a fraudulent transaction reported by a customer corresponding to the second node. Implementations of the described techniques may include hardware, a method or process, or computer software on a computer-accessible medium.

One general aspect includes a non-transitory computer readable medium storing computer-executable instructions that, when executed by a graphics processing unit, cause an ensemble of machine learning sub-engines to: train a machine learning model of the ensemble of machine learning sub-engines using a corpus, where the corpus includes a training data and a test data; classify a plurality of nodes in a graph, which includes nodes and edges and is stored in computer memory, based on the machine learning model, by setting a classification attribute of a first node and a second node of the plurality of nodes to one of a plurality of classifications; and insert an edge in the graph between the first node and the second node in response to the machine learning model detecting a pattern, where the first node corresponds to a first entity type and the second node does not correspond to a second entity type. Other embodiments of this aspect include corresponding computer systems, apparatus, and computer programs recorded on one or more computer storage devices, each configured to perform the actions of the methods.

Implementations may include one or more of the following features. The non-transitory computer readable medium where the first entity type is a device entity type and the second entity type is a customer entity type, and where the edge inserted linking the first node to the second node is in response to the ensemble detecting a smartphone device corresponding to the first node is associated with a fraudulent transaction reported by a customer corresponding to the second node. Implementations of the described techniques may include hardware, a method or process, or computer software on a computer-accessible medium.

In a second embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a machine learning engine including a machine learning model trained using historical transaction data to identify a known pattern; a graph module configured to store and update a graph with incoming transaction data, the graph including nodes and edges, where each node corresponds to an entity type, and where each edge represents a relationship between two nodes; a hotfile module configured to assign one or more functions to each node in the graph; and a hotfile propagation engine programmed to perform functions including: detecting in the incoming transaction data the known pattern identified by the machine learning engine; labeling the incoming transaction data by integrating a first node corresponding to the incoming transaction data into the graph and by inserting an edge linking the first node with an existing node in the graph, where the first node is an entity type based on the incoming transaction data; spreading heat from the existing node to the first node, where the heat corresponds to a classification attribute, and where an amount of the heat spread is based on a weight assigned to the edge connecting the first node with the existing node; fading the heat of the first node based on one or more conditions; and restricting one or more nodes in the graph based on the heat of the first node. Other embodiments of this aspect include corresponding computer systems, apparatus, and computer programs recorded on one or more computer storage devices, each configured to perform the actions of the methods.

Implementations may include one or more of the following features. The system further including a feature vector, where the machine learning engine is configured to minimize a loss function based on an objective function using the feature vector. The system where the feature vector includes one or more of: a hardware identifier of a computing device that originated the incoming transaction data, a phone number of the computing device that originated the incoming transaction data, a unique identifier assigned to a cookie corresponding to the incoming transaction data, an email address, an email domain of the email address, a screen resolution of the computing device that originated the incoming transaction data, and an IP address of the computing device that originated the incoming transaction data. The system where the machine learning engine is configured to adjust the feature vector by adding a feature to the feature vector and removing a feature from the feature vector. The system where the machine learning engine is programmed to perform steps including: detecting an emerging pattern between the first node in the graph and fraud; causing the hotfile module to increase the weight assigned to the edge of the first node, where the amount of the heat spread is based on the weight assigned to the edge; and adjusting a feature vector based on the emerging pattern. The system where the first node corresponds to a customer entity type and the existing node in the graph corresponds to a device entity type. The system where the first node includes a confidence attribute, and the hotfile module is configured to update the confidence attribute of the first node based on the machine learning model. The system where the labeling function includes updating a confidence attribute of the first node based on the machine learning model. The system where the heat of the first node is one of: low, medium, and high. The system where the one or more conditions of the fading function include time and speed. The system further including: a historical data store communicatively coupled to the graph module, where the historical data store contains the historical transaction data. The system further including: a user computing device that originated the incoming transaction data, where the user computing device is configured to receive user input through a graphical user interface of the user computing device then transmit the user input to the machine learning system; where the machine learning system includes a supervised learning system that trains the machine learning model using the user input. The system where the machine learning engine includes a hardware graphics processing unit configured to execute train the machine learning model. The method further including: fading the heat of the first node based on one or more conditions. The method where the one or more conditions of the fading includes time and speed. The method where the heat of the first node is one of: low, medium, and high. The method where the heat is a numeric value within a predetermined range. The computer memory where the machine learning engine includes a machine learning model trained using historical transaction data, and where the heat is a numeric value within a predetermined range. Implementations of the described techniques may include hardware, a method or process, or computer software on a computer-accessible medium.

One general aspect includes a method to automatically detect, label, spread, and fade heat in a graph stored in a graph module, where the graph module is communicatively coupled to a machine learning engine, a hotfile module, and a hotfile propagation engine, the method including: detecting in an incoming transaction data a known pattern identified by the machine learning engine; labeling the incoming transaction data by integrating a first node corresponding to the incoming transaction data into the graph and by inserting an edge linking the first node with an existing node in the graph, where the first node is an entity type based on the incoming transaction data; spreading heat from the existing node to the first node, where the heat corresponds to a classification attribute, and where an amount of the heat spread is based on a weight assigned to the edge connecting the first node with the existing node; and restricting one or more nodes in the graph based on the heat of the first node. Other embodiments of this aspect include corresponding computer systems, apparatus, and computer programs recorded on one or more computer storage devices, each configured to perform the actions of the methods.

Implementations may include one or more of the following features. The method further including: fading the heat of the first node based on one or more conditions. The method where the one or more conditions of the fading includes time and speed. The method where the heat of the first node is one of: low, medium, and high. The method where the heat is a numeric value within a predetermined range. The computer memory where the machine learning engine includes a machine learning model trained using historical transaction data, and where the heat is a numeric value within a predetermined range. Implementations of the described techniques may include hardware, a method or process, or computer software on a computer-accessible medium.

One general aspect includes a computer memory storing computer-executable instructions that, when executed by a graphics processing unit (GPU), cause a graph module, which is communicatively coupled to a machine learning engine, to: detect, by the GPU, in an incoming transaction data a known pattern identified by the machine learning engine; label, by the GPU, the incoming transaction data by integrating a first node corresponding to the incoming transaction data into a graph and by inserting an edge linking the first node with an existing node in the graph, where the first node is an entity type based on the incoming transaction data, and where the graph including nodes and edges, where each node corresponds to an entity type, and where each edge represents a relationship between two nodes; spread heat, by the GPU, from the existing node to the first node, where the heat corresponds to a classification attribute, and where an amount of the heat spread is based on a weight assigned to the edge connecting the first node with the existing node; fade, by the GPU, the heat of the first node based on one or more conditions; and restrict one or more nodes in the graph based on the heat of the first node. Other embodiments of this aspect include corresponding computer systems, apparatus, and computer programs recorded on one or more computer storage devices, each configured to perform the actions of the methods.

Implementations may include one or more of the following features. The computer memory where the machine learning engine includes a machine learning model trained using historical transaction data, and where the heat is a numeric value within a predetermined range. Implementations of the described techniques may include hardware, a method or process, or computer software on a computer-accessible medium.

In a third embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a supervised machine learning system that optimizes a feature vector and trains on a corpus based on historical data, known patterns, and emerging patterns, the system including: a graph module configured to store and update a graph including nodes and edges, where each node corresponds to an entity type, and where each edge represents a relationship between two nodes; a first interface configured to receive (i) historical data and (ii) current event data, where the (i) and (ii) are used to update the graph; a second interface configured to receive user input to classify a first set of nodes in the graph with one of a plurality of classifications; and a machine learning engine programmed to perform steps including: training a machine learning model of the machine learning engine using the corpus, where the corpus includes a training data and a test data; classifying a plurality of nodes in the graph based on the known patterns and the machine learning model, by setting a classification attribute of each node to one of a plurality of classifications, where the plurality of nodes exclude the first set of nodes; detecting, by the machine learning engine, an emerging pattern between a first node and second node in the graph based on the (i) and (ii); inserting an edge between the first node and the second node in the graph in response to the detecting of the emerging pattern; and adjusting the feature vector based on an objective function to minimize a loss function. Other embodiments of this aspect include corresponding computer systems, apparatus, and computer programs recorded on one or more computer storage devices, each configured to perform the actions of the methods.

Implementations may include one or more of the following features. The system where the machine learning engine includes a plurality of supervised machine learning engines, where each unique entity type in the graph is assigned a separate supervised machine learning engine of the plurality of supervised machine learning engines. The system where the machine learning model corresponds to the supervised machine learning engine assigned to the entity type of the first node. The system where the classifying of the first node in the graph includes populating a confidence attribute of the first node, based on the machine learning model. The system where the adjusting the feature vector includes adding a feature to the feature vector. The system where the adjusting the feature vector includes removing a feature from the feature vector. The system the system further including: a historical data store communicatively coupled to first interface, where the test data includes the first set of nodes and their corresponding historical data stored in the historical data store. The system the system further including: a user computing device, which is communicatively coupled to the second interface, configured to transmit a user selection of the one of the plurality of classifications for the first set of nodes in the graph. The system where the graph module, in response to receiving the current event data through the first interface, is configured to set the classification attribute of the plurality of nodes to a value predicted by the machine learning engine. The system where the machine learning engine includes a graphics processing unit. The system where the machine learning engine is a semi-supervised machine learning engine. The system where the current event data includes at least one of: new transaction data, a report of a stolen card, an uninstallation of a software application from a device, and an installation of a software application onto a device. The system where the first node stored by the graph module corresponds to a device entity type and the second node stored by the graph module corresponds to a customer entity type, and where the edge inserted between the first node and the second node is in response to the machine learning engine detecting the emerging pattern between a customer's smartphone device and fraud. The system where the first node includes a confidence attribute, and the graph module is configured to update the confidence attribute of the first node based on the machine learning model that detected the emerging pattern. The system where the supervised machine learning engine is further programmed to optimize a feature vector and train on the corpus. The system further including a second interface configured to receive user input, where the detecting step of the supervised machine learning engine is further based on the user input. The system where the classifying of the plurality of noes in the graph includes populating a confidence attribute of each of the plurality of nodes, based on the machine learning model. The non-transitory computer readable medium where the processor includes a graphics processing unit. Implementations of the described techniques may include hardware, a method or process, or computer software on a computer-accessible medium.

One general aspect includes a system including: a first interface configured to receive (i) historical data and (ii)

current event data; a graph module configured to update a graph including nodes and edges, where each node corresponds to an entity type, and where each edge represents a relationship between two nodes; and a supervised machine learning engine programmed to perform steps including: training a machine learning model of the supervised machine learning engine using a corpus, where the corpus includes a training data and a test data; classifying a plurality of nodes in the graph based on a known pattern and the machine learning model, by setting a classification attribute of each node to one of a plurality of classifications; detecting, by the supervised machine learning engine, an emerging pattern between a first node and second node of the plurality of nodes in the graph based on at least the (i) and (ii); inserting an edge between the first node and the second node in the graph in response to the detecting of the emerging pattern; and adjusting a feature vector of the supervised machine learning engine based on an objective function to minimize a loss function. Other embodiments of this aspect include corresponding computer systems, apparatus, and computer programs recorded on one or more computer storage devices, each configured to perform the actions of the methods.

Implementations may include one or more of the following features. The system where the supervised machine learning engine is further programmed to optimize a feature vector and train on the corpus. The system further including a second interface configured to receive user input, where the detecting step of the supervised machine learning engine is further based on the user input. The system where the classifying of the plurality of noes in the graph includes populating a confidence attribute of each of the plurality of nodes, based on the machine learning model. The non-transitory computer readable medium where the processor includes a graphics processing unit. Implementations of the described techniques may include hardware, a method or process, or computer software on a computer-accessible medium.

One general aspect includes a non-transitory computer readable medium storing computer-executable instructions that, when executed by a processor, cause a machine learning engine to: train a machine learning model of the machine learning engine using a corpus, where the corpus includes a training data and a test data; classify a plurality of nodes in a graph stored in computer memory based on known patterns and the machine learning model, by setting a classification attribute of each node in the graph to one of a plurality of classifications; detect, by the machine learning engine, an emerging pattern between a first node and second node in the graph based on historical data and current event data; insert an edge between the first node and the second node in the graph in response to the detecting of the emerging pattern; and adjust a feature vector of the machine learning engine based on an objective function to minimize a loss function. Other embodiments of this aspect include corresponding computer systems, apparatus, and computer programs recorded on one or more computer storage devices, each configured to perform the actions of the methods.

Implementations may include one or more of the following features. The non-transitory computer readable medium where the processor includes a graphics processing unit. Implementations of the described techniques may include hardware, a method or process, or computer software on a computer-accessible medium.

In a fourth embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a graph module configured to store and update a graph including nodes and edges, where each node represents an entity type, and where each edge represents a relationship between two nodes; an unsupervised machine learning engine programmed to perform a decision-making process, the unsupervised machine learning engine further configured to: train the decision-making process based on historical data; and output, based on the trained decision-making process, a feature vector; a hotfile module configured to: receive current event data associated with the graph; determine, based on the feature vector and the trained decision-making process, an action to take with respect to the graph; and cause, a hotfile propagation engine, to execute the action. Other embodiments of this aspect include corresponding computer systems, apparatus, and computer programs recorded on one or more computer storage devices, each configured to perform the actions of the methods.

Implementations may include one or more of the following features. The system where the hotfile module is further configured to: determine one or more identities of one or more entities that correspond to hotfile parameters, where determining the action to take is further based on the one or more identities of the one or more entities. The system where training the decision-making process based on the historical data includes configuring one or more computer nodes of the unsupervised machine learning engine without external feedback, and where the historical data is unlabeled. The system where the action includes one or more of: adding or removing a first entity that corresponds to a hotfile; adding or removing a first relationship between two entities of the one or more entities to the hotfile; or modifying permissions of nodes associated with one or more entities of the hotfile. The system where the current event data is associated with a transaction between two entities of the graph. The system where the historical data is associated with a plurality of transactions between entities of the graph. The method further including: determining the modification to the hotfile based on the first graph representation, the plurality of definitional functions, and historical hotfile data. The method where a first definitional function of the plurality of definitional functions indicates a degree of relationship between a first entity of the second plurality of entities and a second entity of the second plurality of entities. The method where training the artificial neural network includes providing, to the artificial neural network, data including the one or more graph representations, and where the data is unlabeled. The method where the one or more graph representations are associated with one or more transactions between at least two of the plurality of entities. The method where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The method further including: determining a transaction between at least two entities of the first plurality of entities; and causing, based on the hotfile, rejection of the transaction. The apparatus where the instructions, when executed by the one or more processors, cause the apparatus to: determining the modification to the hotfile based on the first graph representation, the plurality of definitional functions, and historical hotfile data. The apparatus where a first definitional function of the plurality of definitional functions indicates a degree of relationship between a first entity of the second plurality of entities and a second entity of the second plurality of entities. The apparatus where training the artificial neural network includes providing, to the artificial neural network, data including the one or more graph representations, and where the data is unlabeled. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the instructions, when executed by the one or more processors, cause the apparatus to: determining a transaction between at least two entities of the first plurality of entities; and causing, based on the hotfile, rejection of the transaction. Implementations of the described techniques may include hardware, a method or process, or computer software on a computer-accessible medium.

One general aspect includes a method including: determining data corresponding to one or more graph representations of a first plurality of entities, where the one or more graph representations indicate a plurality of relationships between at least two of the first plurality of entities, and where the one or more graph representations are unlabeled; training, using the data corresponding to the one or more graph representations, an artificial neural network for machine learning executing on one or more computing devices, where the artificial neural network includes a plurality of nodes, where the nodes are configured to process an input, and where the plurality of nodes are configured based on the one or more graph representations; determining a first graph representation including a second plurality of entities; determining a plurality of definitional functions corresponding to one or more of the second plurality of entities; and receiving, from the artificial neural network and based on the first graph representation and the plurality of definitional functions, output indicating a modification to a hotfile. Other embodiments of this aspect include corresponding computer systems, apparatus, and computer programs recorded on one or more computer storage devices, each configured to perform the actions of the methods.

Implementations may include one or more of the following features. The method further including: determining the modification to the hotfile based on the first graph representation, the plurality of definitional functions, and historical hotfile data. The method where a first definitional function of the plurality of definitional functions indicates a degree of relationship between a first entity of the second plurality of entities and a second entity of the second plurality of entities. The method where training the artificial neural network includes providing, to the artificial neural network, data including the one or more graph representations, and where the data is unlabeled. The method where the one or more graph representations are associated with one or more transactions between at least two of the plurality of entities. The method where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The method further including: determining a transaction between at least two entities of the first plurality of entities; and causing, based on the hotfile, rejection of the transaction. The apparatus where the instructions, when executed by the one or more processors, cause the apparatus to: determining the modification to the hotfile based on the first graph representation, the plurality of definitional functions, and historical hotfile data. The apparatus where a first definitional function of the plurality of definitional functions indicates a degree of relationship between a first entity of the second plurality of entities and a second entity of the second plurality of entities. The apparatus where training the artificial neural network includes providing, to the artificial neural network, data including the one or more graph representations, and where the data is unlabeled. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the instructions, when executed by the one or more processors, cause the apparatus to: determining a transaction between at least two entities of the first plurality of entities; and causing, based on the hotfile, rejection of the transaction. Implementations of the described techniques may include hardware, a method or process, or computer software on a computer-accessible medium.

One general aspect includes an apparatus including: one or more processors; and memory storing instructions that, when executed by the one or more processors, cause the apparatus to: determine data corresponding to one or more graph representations of a first plurality of entities, where the one or more graph representations indicate a plurality of relationships between at least two of the first plurality of entities, and where the one or more graph representations are unlabeled; train, using the data corresponding to the one or more graph representations, an artificial neural network for machine learning executing on one or more computing devices, where the artificial neural network includes a plurality of nodes, where the nodes are configured to process an input, and where the plurality of nodes are configured based on the one or more graph representations; determine a first graph representation including a second plurality of entities; determine a plurality of definitional functions corresponding to one or more of the second plurality of entities; and receive, from the artificial neural network and based on the first graph representation and the plurality of definitional functions, output indicating a modification to a hotfile. Other embodiments of this aspect include corresponding computer systems, apparatus, and computer programs recorded on one or more computer storage devices, each configured to perform the actions of the methods.

Implementations may include one or more of the following features. The apparatus where the instructions, when executed by the one or more processors, cause the apparatus to: determining the modification to the hotfile based on the first graph representation, the plurality of definitional functions, and historical hotfile data. The apparatus where a first definitional function of the plurality of definitional functions indicates a degree of relationship between a first entity of the second plurality of entities and a second entity of the second plurality of entities. The apparatus where training the artificial neural network includes providing, to the artificial neural network, data including the one or more graph representations, and where the data is unlabeled. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the instructions, when executed by the one or more processors, cause the apparatus to: determining a transaction between at least two entities of the first plurality of entities; and causing, based on the hotfile, rejection of the transaction. Implementations of the described techniques may include hardware, a method or process, or computer software on a computer-accessible medium.

In a fifth embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including: a graph module configured to store and update a graph including nodes and edges, where each node represents an entity, where each entity is associated with one or more classifications, and where each edge represents a relationship between two entities; one or more machine learning engines configured to perform a respective decision-making process, where each of the one or more machine learning engines is associated with at least one of the one or more classifications, and where each machine learning engine is further configured to: train the respective decision-making process based on historical data associated with the one of the one or more classifications; receive new data associated with the graph; and determine, based on the new data and using the trained respective decision-making process, hotfile parameters; and a hotfile propagation engine configured to: determine, based on the hotfile parameters and historical hotfile data, an action to take with respect to a hotfile; and cause the action. Other embodiments of this aspect include corresponding computer systems, apparatus, and computer programs recorded on one or more computer storage devices, each configured to perform the actions of the methods.

Implementations may include one or more of the following features. The system where the hotfile propagation engine is further configured to: determine one or more identities of one or more entities that correspond to the hotfile parameters, where determining the action to take with respect to the hotfile is further based on the one or more identities of the one or more entities. The system where each of the one or more machine learning engines is associated with a different entity of the graph. The system where the action includes one or more of: adding or removing a first entity of a plurality of entities to the hotfile; adding or removing a first relationship between two entities of the plurality of entities to the hotfile; or modifying permissions of the hotfile associated with one or more entities of the plurality of entities. The system where the new data is associated with a transaction between two entities of the graph. The system where the historical data is associated with a plurality of transactions between entities of the graph. The method where each of the second plurality of entities is associated with a corresponding machine learning model. The method further includes determining a characterization of the first graph representation including: transmitting output from the first artificial neural network and the second artificial neural network to a third artificial neural network; and receiving, from the third artificial neural network, the modification to the hotfile. The method where the modification to the hotfile is based on historical hotfile data. The method where the one or more graph representations are associated with one or more transactions between at least two of the plurality of entities. The method where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The method further including: determining a transaction between at least two entities of the first plurality of entities; and causing, based on the hotfile, rejection of the transaction. The apparatus where each of the second plurality of entities is associated with a corresponding machine learning model. The apparatus where the memory further stores instructions that, when executed by the one or more processors, cause the apparatus to: determine a characterization of the first graph representation including: transmitting output from the first artificial neural network and the second artificial neural network to a third artificial neural network; and receiving, from the third artificial neural network, the modification to the hotfile. The apparatus where the modification to the hotfile is based on historical hotfile data. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the memory further stores instructions that, when executed by the one or more processors, cause the apparatus to: determine a transaction between at least two entities of the first plurality of entities; and cause, based on the hotfile, rejection of the transaction. Implementations of the described techniques may include hardware, a method or process, or computer software on a computer-accessible medium.

One general aspect includes a method including: determining data corresponding to one or more graph representations of a first plurality of entities, where the one or more graph representations indicate a plurality of relationships between the first plurality of entities; training, for a first entity type, a first artificial neural network for machine learning executing on one or more first computing devices, where the first artificial neural network includes a plurality of nodes, and where the plurality of nodes are configured based on a first portion of the data corresponding to the first entity type; training, for a second entity type, a second artificial neural network for machine learning executing on the one or more first computing devices, where the second artificial neural network includes a second plurality of nodes, and where the second plurality of nodes are configured based on a second portion of the data corresponding to the second entity type; determining a first graph representation including a second plurality of entities, where the second plurality of entities includes a first entity corresponding to the first entity type and a second entity corresponding to the second entity type; and receiving, from the first artificial neural network and the second artificial neural network and based on the first graph representation, output indicating a modification to a hotfile. Other embodiments of this aspect include corresponding computer systems, apparatus, and computer programs recorded on one or more computer storage devices, each configured to perform the actions of the methods.

Implementations may include one or more of the following features. The method where each of the second plurality of entities is associated with a corresponding machine learning model. The method further includes determining a characterization of the first graph representation including: transmitting output from the first artificial neural network and the second artificial neural network to a third artificial neural network; and receiving, from the third artificial neural network, the modification to the hotfile. The method where the modification to the hotfile is based on historical hotfile data. The method where the one or more graph representations are associated with one or more transactions between at least two of the plurality of entities. The method where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The method further including: determining a transaction between at least two entities of the first plurality of entities; and causing, based on the hotfile, rejection of the transaction. The apparatus where each of the second plurality of entities is associated with a corresponding machine learning model. The apparatus where the memory further stores instructions that, when executed by the one or more processors, cause the apparatus to: determine a characterization of the first graph representation including: transmitting output from the first artificial neural network and the second artificial neural network to a third artificial neural network; and receiving, from the third artificial neural network, the modification to the hotfile. The apparatus where the modification to the hotfile is based on historical hotfile data. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the memory further stores instructions that, when executed by the one or more processors, cause the apparatus to: determine a transaction between at least two entities of the first plurality of entities; and cause, based on the hotfile, rejection of the transaction. Implementations of the described techniques may include hardware, a method or process, or computer software on a computer-accessible medium.

One general aspect includes an apparatus including: one or more processors; and memory storing instructions that, when executed by the one or more processors, cause the apparatus to: determine data corresponding to one or more graph representations of a first plurality of entities, where the one or more graph representations indicate a plurality of relationships between the first plurality of entities; train, for a first entity type, a first artificial neural network for machine learning executing on one or more first computing devices, where the first artificial neural network includes a plurality of nodes, and where the plurality of nodes are configured based on a first portion of the data corresponding to the first entity type; train, for a second entity type, a second artificial neural network for machine learning executing on the one or more first computing devices, where the second artificial neural network includes a second plurality of nodes, and where the second plurality of nodes are configured based on a second portion of the data corresponding to the second entity type; determine a first graph representation including a second plurality of entities, where the second plurality of entities includes a first entity corresponding to the first entity type and a second entity corresponding to the second entity type; and receive, from the first artificial neural network and the second artificial neural network and based on the first graph representation, output indicating a modification to a hotfile. Other embodiments of this aspect include corresponding computer systems, apparatus, and computer programs recorded on one or more computer storage devices, each configured to perform the actions of the methods.

Implementations may include one or more of the following features. The apparatus where each of the second plurality of entities is associated with a corresponding machine learning model. The apparatus where the memory further stores instructions that, when executed by the one or more processors, cause the apparatus to: determine a characterization of the first graph representation including: transmitting output from the first artificial neural network and the second artificial neural network to a third artificial neural network; and receiving, from the third artificial neural network, the modification to the hotfile. The apparatus where the modification to the hotfile is based on historical hotfile data. The apparatus where the one or more graph representations are associated with one or more transactions between at least two of the plurality of entities. The apparatus where the modification to the hotfile causes a hotfile propagation engine to: add or remove a first entity of the first plurality of entities to the hotfile; add or remove a first relationship between two entities of the first plurality of entities to the hotfile; or modify permissions of the hotfile associated with one or more entities of the first plurality of entities. The apparatus where the memory further stores instructions that, when executed by the one or more processors, cause the apparatus to: determine a transaction between at least two entities of the first plurality of entities; and cause, based on the hotfile, rejection of the transaction. Implementations of the described techniques may include hardware, a method or process, or computer software on a computer-accessible medium.

These and other features and advantages are described in more detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
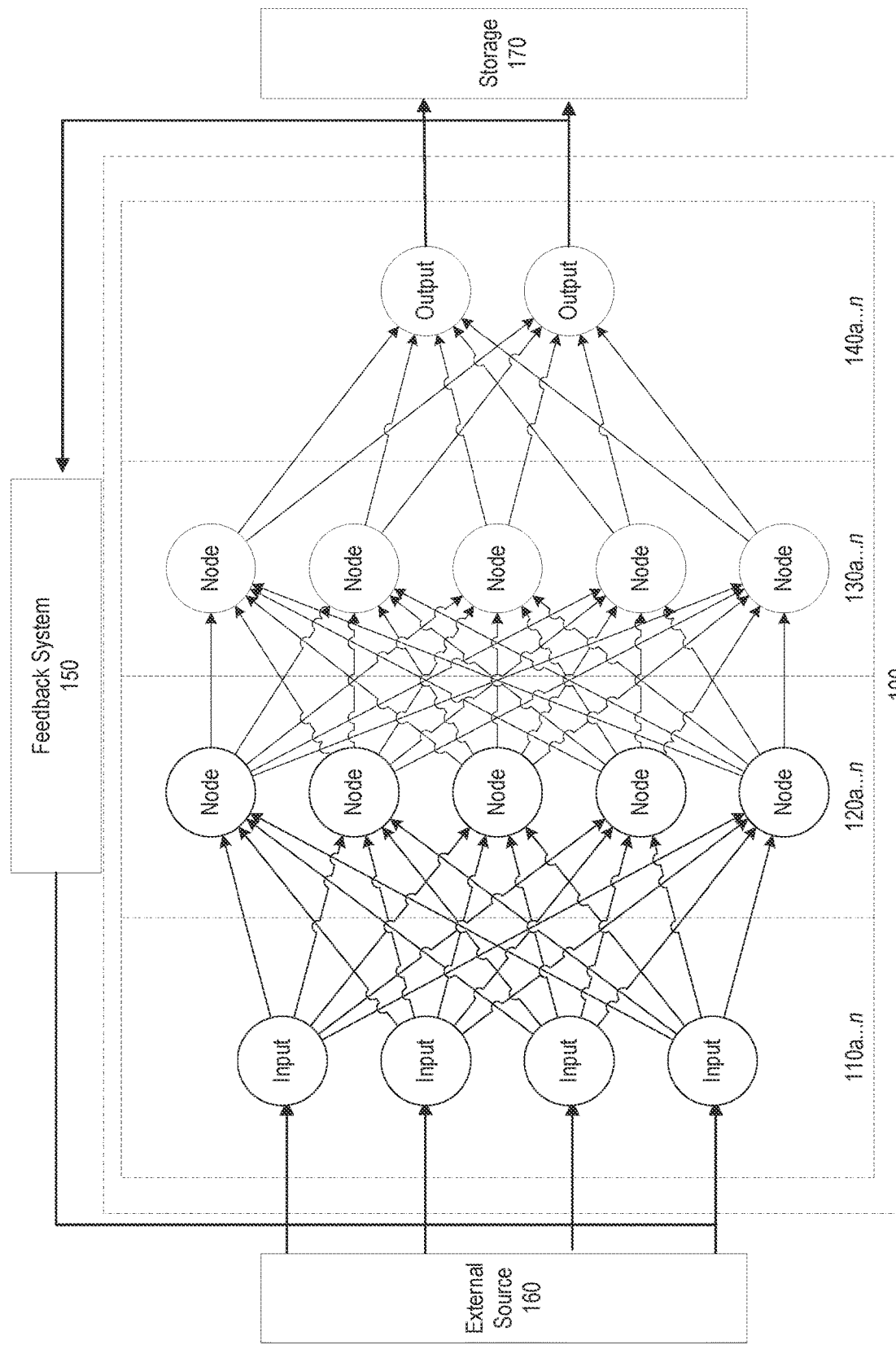
FIG. 1 shows an illustrative artificial neural network on which a machine learning algorithm may be executed in accordance with one or more examples described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

A framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, FIG. 1 illustrates a simplified example of an artificial neural network 100 on which a machine learning algorithm may be executed. FIG. 1 is merely an example of nonlinear processing using an artificial neural network; other forms of nonlinear processing may be used to implement a machine learning algorithm in accordance with features described herein.

In FIG. 1, each of input nodes 110a-n is connected to a first set of processing nodes 120a-n. Each of the first set of processing nodes 120a-n is connected to each of a second set of processing nodes 130a-n. Each of the second set of processing nodes 130a-n is connected to each of output nodes 140a-n. Though only two sets of processing nodes are shown, any number of processing nodes may be implemented. Similarly, though only four input nodes, five processing nodes, and two output nodes per set are shown in FIG. 1, any number of nodes may be implemented per set. Data flows in FIG. 1 are depicted from left to right: data may be input into an input node, may flow through one or more processing nodes, and may be output by an output node. Input into the input nodes 110a-n may originate from an external source 160. Output may be sent to a feedback system 150 and/or to storage 170. The feedback system 150 may send output to the input nodes 110a-n for successive processing iterations with the same or different input data.

In one illustrative method using feedback system 150, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multidimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses from unauthorized activity.

In one example, FIG. 1 depicts nodes that may perform various types of processing, such as discrete computations, computer programs, and/or mathematical functions implemented by a computing device. For example, the input nodes 110a-n may comprise logical inputs of different data sources, such as one or more data servers. The processing nodes 120a-n may comprise parallel processes executing on multiple servers in a data center. And, the output nodes 140a-n may be the logical outputs that ultimately are stored in results data stores, such as the same or different data servers as for the input nodes 110a-n. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 100 may learn and/or be dynamically reconfigured. Though nodes are depicted as having connections only to successive nodes in FIG. 1, connections may be formed between any nodes. For example, one processing node may be configured to send output to a previous processing node.

Input received in the input nodes 110a-n may be processed through processing nodes, such as the first set of processing nodes 120a-n and the second set of processing nodes 130a-n. The processing may result in output in output nodes 140a-n. As depicted by the connections from the first set of processing nodes 120a-n and the second set of processing nodes 130a-n, processing may comprise multiple steps or sequences. For example, the first set of processing nodes 120a-n may be a rough data filter, whereas the second set of processing nodes 130a-n may be a more detailed data filter.

The artificial neural network 100 may be configured to effectuate decision-making. As a simplified example for the purposes of explanation, the artificial neural network 100 may be configured to detect faces in photographs. The input nodes 110*a-n* may be provided with a digital copy of a photograph. The first set of processing nodes 120*a-n* may be each configured to perform specific steps to remove non-facial content, such as large contiguous sections of the color red. The second set of processing nodes 130*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 100 may then predict the location on the face. The prediction may be correct or incorrect.

The feedback system 150 may be configured to determine whether or not the artificial neural network 100 made a correct decision. Feedback may comprise an indication of a correct answer and/or an indication of an incorrect answer and/or a degree of correctness (e.g., a percentage). For example, in the facial recognition example provided above, the feedback system 150 may be configured to determine if the face was correctly identified and, if so, what percentage of the face was correctly identified. The feedback system 150 may already know a correct answer, such that the feedback system may train the artificial neural network 100 by indicating whether it made a correct decision. The feedback system 150 may comprise human input, such as an administrator telling the artificial neural network 100 whether it made a correct decision. The feedback system may provide feedback (e.g., an indication of whether the previous output was correct or incorrect) to the artificial neural network 100 via input nodes 110*a-n* or may transmit such information to one or more nodes. The feedback system 150 may additionally or alternatively be coupled to the storage 170 such that output is stored. The feedback system may not have correct answers at all, but instead base feedback on further processing: for example, the feedback system may comprise a system programmed to identify faces, such that the feedback allows the artificial neural network 100 to compare its results to that of a manually programmed system.

The artificial neural network 100 may be dynamically modified to learn and provide better input. Based on, for example, previous input and output and feedback from the feedback system 150, the artificial neural network 100 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 100, such that the artificial neural network 100 may vary its nodes and connections to test hypotheses.

The artificial neural network 100 need not have a set number of processing nodes or number of sets of processing nodes, but may increase or decrease its complexity. For example, the artificial neural network 100 may determine that one or more processing nodes are unnecessary or should be repurposed, and either discard or reconfigure the processing nodes on that basis. As another example, the artificial neural network 100 may determine that further processing of all or part of the input is required and add additional processing nodes and/or sets of processing nodes on that basis.

The feedback provided by the feedback system 150 may be mere reinforcement (e.g., providing an indication that output is correct or incorrect, awarding the machine learning algorithm a number of points, or the like) or may be specific (e.g., providing the correct output). For example, the machine learning algorithm 100 may be asked to detect faces in photographs. Based on an output, the feedback system 150 may indicate a score (e.g., 75% accuracy, an indication that the guess was accurate, or the like) or a specific response (e.g., specifically identifying where the face was located).

The artificial neural network 100 may be supported or replaced by other forms of machine learning. For example, one or more of the nodes of artificial neural network 100 may implement a decision tree, associational rule set, logic programming, regression model, cluster analysis mechanisms, Bayesian network, propositional formulae, generative models, and/or other algorithms or forms of decision-making. The artificial neural network 100 may effectuate deep learning.

Figure 6:
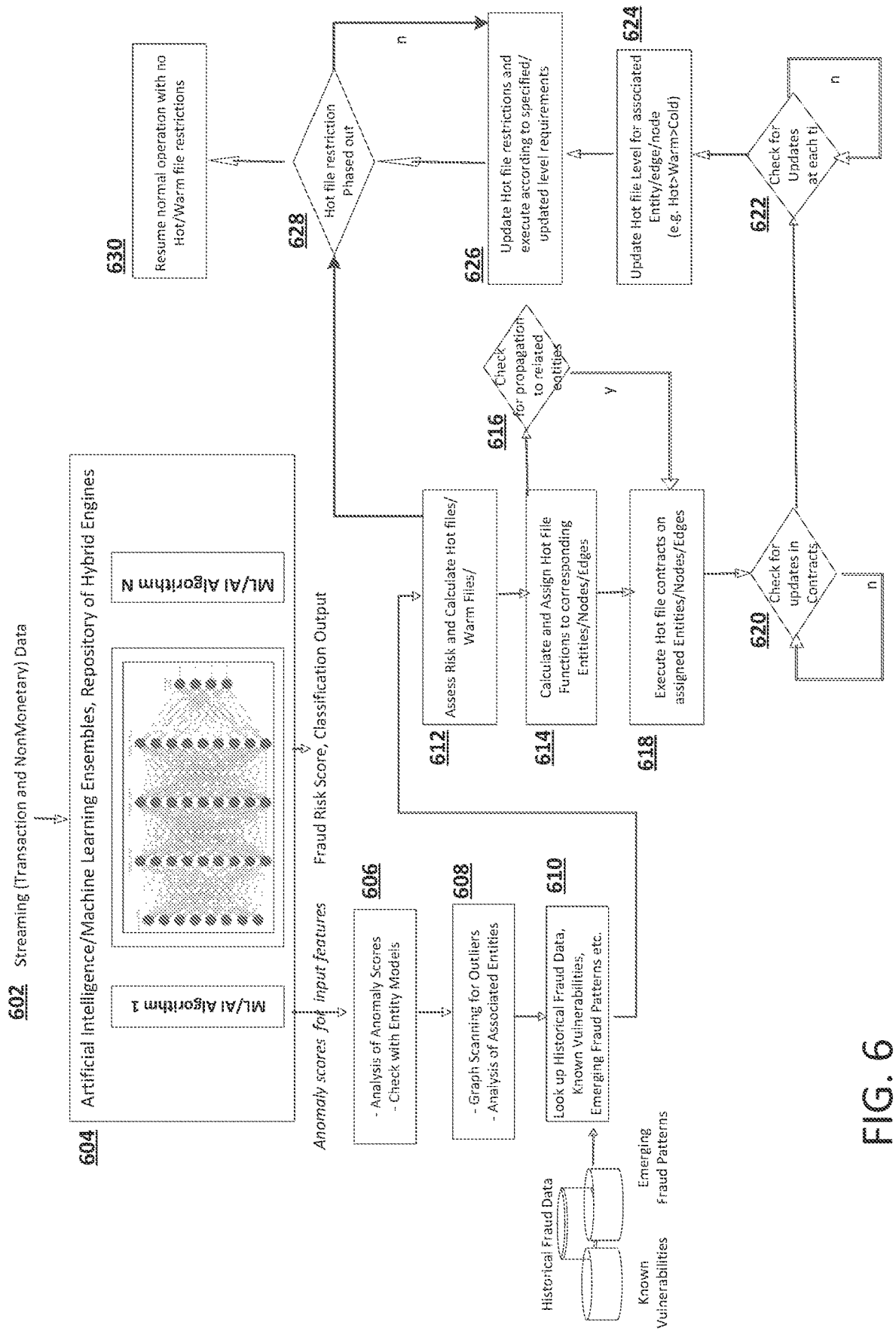
FIG. 6 describes a high-level overview of an ensemble machine learning system in accordance with one or more examples described herein.

FIG. 6 is a flow chart depicting one example of a system implementing one or more machine learning models in accordance with features described herein. It illustrates a machine learning ensemble that may be used to generate an outcome for a node in the graph.

In step 602, the system may receive data. The data may correspond to one or more transactions, such as log-in transactions, computer network transactions, financial transactions, and/or the like. The data may be streaming, such that the data may be continually transmitted to the system. In other examples, the data need not be streaming, such that aggregated data (such as historical data collected over a period of time) may be received. The data may be received from one or more computing devices, such as over a network. The data may be received from a series of computing devices located nationwide, aggregated by a second computing device, then transmitted to the system. For example, the data may comprise log-in events (such as data relating to successful and unsuccessful log-in transactions) on a plurality of distributed wireless routers.

The data received may relate to one or more entities and/or one or more associations between the one or more entities. For example, the data received may be related to an online purchase (such as a purchase of an article of clothing) using a credit card. Such a purchase may have involved use of a credit card on a web site, which may then use one or more credit card processing services, which may ultimately be connected with one or more financial institutions. As such, the online purchase may involve a number of entities, such as those that may be depicted in a graph structure generated by the graph module 702A or 702B (e.g., FIGS. 2-4). As described with respect to FIGS. 2-4, entities may be as nodes in a graph. From the example above, the entities in a graph representation of received data corresponding to an online purchase may comprise a computing device used to make the purchase, the credit card used to make the purchase, an account associated with the credit card, and a merchant that the purchase was made with. Though such a graph representation may be envisioned, the system need not receive the data in a graph form.

At step 604, the system may use a machine learning ensemble to determine an output based on inputs. In one example, the output may include anomaly scores, heat scores, and classification output; and the ensemble may receive transaction data and non-monetary data as input. In another example, the system may use the machine learning ensemble to produce output comprising a fraud risk score for a purchase, such as an online purchase. The ensemble may determine an output using one or more machine learning models—e.g., decision trees, support vector machines, neural network, Boltzmann machine, restricted Boltzmann machine, autoencoder, clustering algorithms (knn, shared nearest neighbors, DBSCAN, K means, and others). For example, the machine learning ensemble may analyze a feature vector for a node in the graph to generate an outcome indicative of the heat of the node. The machine learning ensemble uses one or more machine learning engines to perform the analysis. For example, the machine learning ensemble may use a linear programming engine, a regression engine, a neural network engine, a random forest engine, a decision tree engine, and/or a combination of the aforementioned to analyze the stored graph.

The ensemble may be a repository of machine learning engines—some may be hybrid engine, homogenous, or heterogeneous. The ensemble is homogenous where the individual machine learning models that make up the ensemble are of the same type. The ensemble is heterogeneous where the individual machine learning models that make of the ensemble are of different types. In some example, each machine learning model in the ensemble may be trained using a randomly drawn subset of training data. That training data may be the same for each machine learning model, in some examples; while in other examples, the training data may also be different (e.g., tailored) for different machine learning models.

In some examples, the ensemble may use parallel ensemble techniques. The ensemble may use bootstrap aggregating (sometimes referred to as bagging) to determine an output. With bootstrap aggregating, the ensemble may contain a number of machine learning models where each model may vote with equal weight on the output (e.g., when the output is a classification). The output of each model in the ensemble may be averaged together (e.g., when the output is a continuous variable). In other examples, an ensemble may incorporate Bayesian model combinations. In yet other examples, an ensemble may include a bucket of machine learning models and use a model selection algorithm to select the best model for a particular entity type. Alternatively, each entity type might include its own machine learning model, rather than each entity. For example, all not-for-profit organizations may be one entity type. Meanwhile, government organizations may be another entity type. Private law firms may be another entity type. Moreover, a particular entity may be one or more entity types. Therefore, in some examples, more than one ML model may run on the same set of data—further training and refining the underlying stored graph.

The ensemble may use sequential ensemble techniques. For example, the ensemble may use boosting techniques where each model in the ensemble is trained incrementally. In boosting, models in the ensemble may be trained using training instances that previous models in the ensemble were unable to provide correct output for. With boosting the ensemble may include a sequence of models where each subsequent model tries to learn from the mistakes that previous models made. Each model may make a prediction and the prediction may be weighted according to where the model is located in the sequence, for example, such as adaboost, which uses weighted versions of the data and more weight is given to instances of previously misclassified training data.

The ensemble may also use stochastic gradient boosting. The ensemble may have a loss function that is optimized by adding learners to the ensemble. The loss function may be differentiable. For example, the loss function may be a squared error or logarithmic loss function. The learners may be decision trees or regression trees. The regression tree output may be used for determining splits in the tree and can correct the residuals in the predictions. In one example, the trees may be constructed greedily and the trees may choose split points that minimize the loss function.

Each entity may have an associated machine learning model. And the associated machine learning model may be supervised or unsupervised. For example, in FIG. 7, each of the machine learning models 712(1)-(n) may be associated with a different entity. A machine learning model associated with a particular entity may be configured to determine a fraud risk score for the particular entity. For example, each machine learning model may be configured to determine a fraud risk score for a credit card based on a transaction (e.g., an online purchase) involving the credit card.

Machine learning models, such as those associated with a particular entity in step 604, may provide output associated with one or more entities. Output, as illustrated in FIG. 1, may comprise an anomaly score, an indication of a level of risk, or the like. An anomaly score output from a machine learning model may comprise an indication of how different input data was from, for example, training data provided to the machine learning model. For example, machine learning models may output a high fraud risk score for one or more entities based on determining that the one or more entities are, per the received data (e.g., input data as illustrated in FIG. 1), behaving in a different manner than one or more similar entities provided in training data. Such a high fraud risk score may indicate that a transaction was fraudulent (e.g., that a purchase was not made by the owner of the credit card). In the online purchase example referenced above, a machine learning model associated with a credit card may determine that the credit card was used fraudulently. Each entities' associated machine learning model may have different output. For example, in a transaction involving a merchant and a credit card, a machine learning model associated with the merchant may output a low fraud score, whereas a second machine learning model associated with the credit card may output a high fraud score. In some examples, the anomaly score may share a purpose with or be the same as the confidence score described herein.

In step 604, the learners in the machine learning ensemble may be constrained. For example, one or more learner may be constrained by a maximum number of layers, nodes, splits, leaf nodes, combination thereof, and/or other criterion. Learners may be added one at a time to the ensemble while not changing learners that have been added previously. The ensemble may use gradient descent or functional gradient descent to minimize loss while learners are added. The ensemble may calculate loss, then add a tree that will reduce the loss—parameterize the tree, then modify the parameters of the tree so that the loss is reduced. Output of added tree is combined with output of existing sequence of trees to improve the final output and minimize loss. In some embodiments, the aforementioned techniques may use tree constraints, weighted updates, stochastic gradient boosting, penalized gradient boosting, a combination of the aforementioned, and/or other techniques to further optimize the system. Other examples of techniques that may be used in step 604 include, but are not limited to bagged decision trees, random forest, gradient tree boosting, and/or stacking. In one example, a random forest approach with multiple decision trees may comprise using samples drawn with replacement, selecting random subset of features for each tree, and/or randomizing splitting thresholds. In one example, a stacking approach may include where several base models are trained using available data—a combiner model is trained using the outputs of the several base models as input, and creates a final output or prediction. Stacking may involve tuning hyper-parameters.

In step 606, the system may compare output from the machine learning models to entity models. An entity model may be any data corresponding to an entity, such as an expected level of risk and/or variance, an indication of the capabilities of the entity, or the like. Output from a machine learning model may indicate a low level of risk associated with an entity of a particular type of entities, but the entity model may indicate that no risk is tolerable for that particular type of entity. For example, a certain type of credit card may require a high level of security, such that any questionable activity involving the credit card causing anomalous output from a machine learning model may warrant concern.

In step 608, a computing device and/or machine learning model may analyze the data received and the output from step 604 and the comparisons performed in step 606 to determine anomalies. The comparison may be performed by a computing device and/or the same or a different machine learning model than that used in step 604, and/or may be used in addition or in combination with other machine learning models. The anomalies determined in step 608 may comprise determining anomalies relating to the aggregate of entities otherwise individually analyzed in step 604. As such, output from machine learning models in step 608 may contradict decisions made by other machine learning models, suas in step 604. For example, each entity in an online purchase may not have been determined to be anomalous in steps 604 and/or 606, but the interrelation between two entities may suggest an anomaly (e.g., because two entities, when used together, may be commonly associated with fraud).

In step 610, the system may use historical data (e.g., historical fraud data, known vulnerabilities, and/or emerging fraud patterns) and compare such historical data to the received data from step 602 and/or the output/analysis from either or both steps 604 and 606 and/or the anomalies determined in step 608. Such a comparison may be made using a conventional computing device and/or a machine learning model (e.g., the same or a different machine learning model as compared to the model used in steps 604 and 608). Entities may, individually and/or as related, not necessarily suggest an anomaly; however, historical data (e.g., a history of a device always being used fraudulently) may suggest an anomaly. As one example, a stolen credit card may have been involved in a large number of fraudulent transactions, such that a subsequent transaction may appear legitimate but, with the benefit of historical context, be fraudulent as well. As another example, the machine learning model may cluster a first transaction with one or more other transactions and may determine that the cluster is an outlier when compared with other clusters (e.g., from prior transactions). The machine learning model may, based on such clustering activity, indicate a transaction is fraudulent.

In step 612, the system may assess the risk score of each entity in the online purchase and calculate hot files/warm files for each entity. A series of human-designed pattern recognition rules, which are sometimes referred to as "hot files," may be used to detect fraud in, for example, banking transactions. Step 612 may comprise aggregating output from steps 604, 608, and 610 and, for example, resolving conflicts between inconsistent output. For example, a credit card may be considered individually to have no risk, but its association with a known compromised point-of-sale system, in conjunction with a history of the point-of-sale system being associated with later fraud, may result in a high risk score being associated with the credit card. A hot file or warm file may be updated accordingly.

Conflicts in output between conflicting machine learning models may be resolved by analyzing, for example, a comparative weight of output from each model. For example, a machine learning model in step 604 may suggest that a particular entity seems to be only 1% anomalous, whereas a second machine learning model in step 610 may, based on historical data, known vulnerabilities, and/or emerging fraud patterns, suggest that the particular entity is 90% anomalous. Whereas the former result may, in some circumstances, suggest that the entity is fine, the latter determination may be given more weight.

In step 614, the system may calculate and assign hot file functions to each entity and node. The decision-making process in steps 604, 608, and 610, culminating in the assessment in step 612, may suggest that one or more entities or relationships between entities may be high risk. Such a high risk may warrant use of a hot file. As a simplified example, a credit card may be determined to be high risk, and a hot file with restrictions may be developed such that the credit card is rejected when used at a point-of-sale system. Such hot file functions may be directly associated with an entity (e.g., an indication that a certain type of computing device is extremely risky), a relationship between entities (e.g., that two entities, when used together, are extremely risky), or the like. For example, the system may use the fraud risk scores determined in step 604 to determine a hot file function for each of the entities that was involved in a transaction corresponding to the data received in step 602.

The hot file functions may be associated with a hot file restriction. A hot file restriction may, for example, cause one or more devices to deny a transaction involving a particular entity associated with the restriction. As such, a hot file restriction may be a decision made on the basis of one or more hot file functions.

One or more entities may be added to a hot file. For example, based on the fraud risk score or classification outputs, the credit card and the computing device involved in the fraudulent online purchase may be added to a hot file. A hot file may comprise both entities with hot file functions as well as entities without hot file functions. For example, a hot file may comprise a hot file function related to a credit card, but for contextual purposes may also contain information about related entities (e.g., point-of-sale systems).

In step 616, the system may determine whether to propagate hot file functions to other entities related to an entity with a hot file function. A hot file function for one entity may suggest corresponding hot file functions for other, related entities. For example, if a point-of-sale system is considered compromised, devices communicatively coupled to that point-of-sale system (e.g., a store's internal servers) may be correspondingly compromised. The hot file propagation engine 706 may determine relationships between an entity with a hot file function and other entities and, based on those relationships, propagate second hot file functions to the other entities. For example, the system may determine that an owner of a credit card and a company that issued the credit card are related to the credit card because they are both linked to the credit card by edges in a graph representation of the entities. The hot file propagation engine 706 may then use a machine learning model (either the same or different than other aforementioned machine learning models) that has been trained on historical data 710 (the historical data may contain historical propagation data) to determine whether the entities connected to the credit card should be added to a hot file.

In step 618, the system may execute hot file contracts on the assigned entities/nodes/edges within the graph. Executing may merely comprise applying the hot file such that the hot file functions and restrictions are applied to their respective entities, e.g., in future transactions. For example, if a hot file function is assigned to a credit card entity in step 614, then executing the hot file in step 618 may comprise causing the function to execute when a credit card corresponding to the credit card entity is used. As another example, executing may comprise propagating hot file restrictions to computing devices such that, for example, a credit card associated with a hot file restriction may not be used.

In step 620, the system may check for updates in contracts. Contracts specifying a relationship between two entities may be modified, causing a corresponding change in a graph representation of the two entities. As such, if there is a change in a contract, an entity, a relationship between one or more entities, and/or a hot file function may be modified.

In step 622, the system may check for updates to hot files, e.g., at a predetermined time interval. The graph module 702A may add additional nodes and/or edges and/or remove nodes and/or edges from the graph structure. Hot file functions and/or restrictions may be modified and/or removed via an update. For example, a computer used to complete an online purchase with a first credit card may be used for another online purchase using a second credit card, suggesting that the hot file function(s) corresponding to the computer should account for both transactions, and/or that two entities (e.g., the first and second credit cards) should be connected. Such changes may be made by an update. An update may comprise a modification by an administrator, e.g., to weaken or strengthen a hot file function.

In step 624, the system may update a hot file level (e.g., hot, warm, or cold) for an entity/edge/node. A hot file level may be a characterization of one or more hot file functions and/or restrictions, a weighting of one or more hot file functions and/or restrictions, or some other manner in which the strength of a hot file may be characterized or quantified. Over time, a hot file may become less reliable and/or important, suggesting that the effectiveness of the hot file should be lessened. For example, the accuracy of a hot file function may degrade over time, or a determination made about a computing device one year ago may no longer be accurate. As such, the system may, over time, lower the hot file level from a "hot" value (e.g., a most powerful and/or relevant value for all or portions of the hot file) to a "cold" value (e.g., a least powerful and/or least relevant value for all or portions of the hot file). For example, a smartphone may be added to a hot file responsive to determining that a current operating system executing on the smartphone may be compromised. Over time, the operating system may be changed such that the operating system is no longer compromised. Whether in response to the change in the operating system or merely as a result of time, the hot file corresponding to the smartphone may be slowly updated from a "hot" value (e.g., 100% applicability) to a "cold" value (e.g., 1% applicability). The reverse may apply as well: hot files may become more "hot" over time. For example, over time, a credit card used frequently may become increasingly exposed to risk, counseling for the strength of a hot file to increase over time.

In step 626, the system may execute the updated hot file. Execution may be the same as performed in step 618, albeit in view of the updates to the hot file. If the hot file specifies restrictions, the restrictions may be applied in view of any updates in step 624. For example, a restriction from a "hot" (e.g., 100% applicable) hot file may have prevented use of a type of credit card in a certain type of transaction, but an update (e.g., in step 624) of the hot file from 100% applicable to 10% applicable may result in the restriction being partially lifted.

In step 628, the system may phase out hot file restrictions. As suggested by the aforementioned transition from "hot" to "cold" hot files, hot files may expire, e.g., due to time. Expiration of a hot file may result in one or more restrictions corresponding to a hot file being lifted. If one or more hot files has not phased out, the flow may return to step 626. Otherwise, the flow chart may proceed to step 630.

In step 630, the system may resume normal operation with no hot/warm file restrictions on the entities that participated in the fraudulent online transaction. In other words, in the absence of any hot files, no restrictions may be applied to any entities or relationships between entities.

The complexity and speed of financial transactions makes fraud particularly difficult to detect and to act upon. Financial institutions may use a series of human-designed pattern recognition rules, which are sometimes referred to as "hot files," to detect fraud in, for example, banking transactions. But such human-designed conditions are slow and undesirably inaccurate, particularly given the speed and near real-time streaming of financial transactions. The situation is further exacerbated given the complexity of modern financial transactions that make determining complex associations between seemingly unrelated sets of data extremely difficult and nearly impossible for humans without a machine learning system, such as the one illustrated in FIG. 6. At least one approach described herein to address various shortcoming in a hot file system involves implementing the hot file in a graph structure in computer memory, then enhancing the graph structure with one or more machine learning technologies described herein.

In one example, the graph structure may be stored in computer memory and maintained using a graph module 702A, 702B. The graph module establishes a plurality of nodes and the relationships between those nodes. Nodes may alternatively be referred to as vertices. A relationship between two nodes may be referred to as an edge. Collectively, the nodes and relationships may be referred to as a computation graph and/or computational graph. The graph module may determine initial node configurations. An initial node configuration may be a basic, memoryless configuration of nodes and relationships between nodes. Such a configuration may be desirable to ensure that the nodes may learn without being inclined towards any particular decision-making process. The initial configuration may be designed to avoid any particular conclusions based on input data, such that the nodes learn without bias. For example, the initial node configuration may comprise a default number of nodes of a plurality of different types. A node may comprise a value (e.g., a constant), equation, and/or other mathematical and/or computational function. A relationship between one or more nodes may comprise one or more decisions, weights, or other associations between one or more nodes such that, for example, the output of one node comprises the input (e.g., input as weighted and/or scaled) for another node.

The graph module may train the initial node configurations, in effect allowing the computational graph to dynamically reconfigure to effectuate learning. This may be effectuated by input and output associated with one or more machine learning models. In one example, based on data processed by the nodes and edges with respect to a machine learning module, the graph module may reconfigure one or more nodes and/or the edges. Functions may be entirely changed or modified, edges may be weighted more or less strongly (or entirely added/removed), or the like. For example, returning to the example provided above, the weighting value of 3 may have been too strong, and the weight value may be changed to 1. As such, the value of 4 may be passed to the second node, with the result of the processing now being 64, rather than 1728.

In another example, a first node may be associated with the function $x^2$, a second node may be associated with the function $x^3$, and the relationship between the nodes may have a weight value of one-half. If the number 2 is input into the first node, it may become 4. It may then be passed to the second node and multiplied by the weight value, becoming 2. It may then be cubed to result in 8. A relationship between one or more nodes may be unidirectional or multi-directional such that, for example, a value from a first node to a second node may be returned by the second node to the first node after processing. In this manner, processing involving nodes need not follow a particularized linear path. Where two nodes are connected, the two nodes may be said to be directly dependent, whereas when two nodes are not connected, the two nodes may be said to be indirectly dependent.

The graph module 702A, 702B may receive and execute instructions to modify the computational graph. Output from the computational graph may be tested for accuracy and/or precision. Based on these tests, the computational graph may be reconfigured. The accuracy and/or precision may be based on, for example, human evaluation of output, processing by a computing device, or the like. Alternatively, the graph module may independently determine modifications to the computational graph. For example, over time, commonalities and/or differences in data provided to the nodes and/or edges may be determined. Based on these commonalities and/or differences, the graph module may determine modifications to the computational graph which identify these commonalities and/or differences. For example, the nodes and/or edges may be provided a large set of images of human faces, and over time the graph module may detect and thereby learn, based on the set, that human faces typically feature two eyes, a nose, and a mouth. Such self-learning may be used in a so-called unsupervised machine learning model, wherein the machine learning model reconfigures nodes and/or edges without external feedback.

The graph module may directly or indirectly segment and/or collect the nodes and/or edges. Modifications may suggest that one group of nodes and/or edges may share a commonality. For example, one group of nodes may never be used. As a result, such nodes and/or edges may be segmented and/or collected. Such collected nodes and/or edges may be collectively weighted or modified.

The plurality of nodes and the relationships between nodes may be stored in computer memory. For example, each node may be stored, in a first tabular database, as a row with a unique identification value (e.g., a key), whereas each relationship may be stored, in a second tabular database, as a row correlating two unique identifications and comprising a weighting value. Any particular method of storing and/or representing the plurality of nodes and the relationships between nodes may be implemented in accordance with the features described herein. For example, each node may comprise a separate computing device configured to perform a particular processing step, and an administrative computing device may store a database of the separate computing devices and their respective relationships. As another example, nodes and edges may be stored in one or more relational databases. Whereas first portions of a machine learning model may be stored in a first manner, second portions of a machine learning model may be stored in a second manner. For example, a first machine learning model may be developed for smartphones and corresponding nodes may be stored in a tabular database, whereas a second machine learning model may be developed for personal computers and corresponding nodes may be stored in a non-tabular database.

Figure 2A:
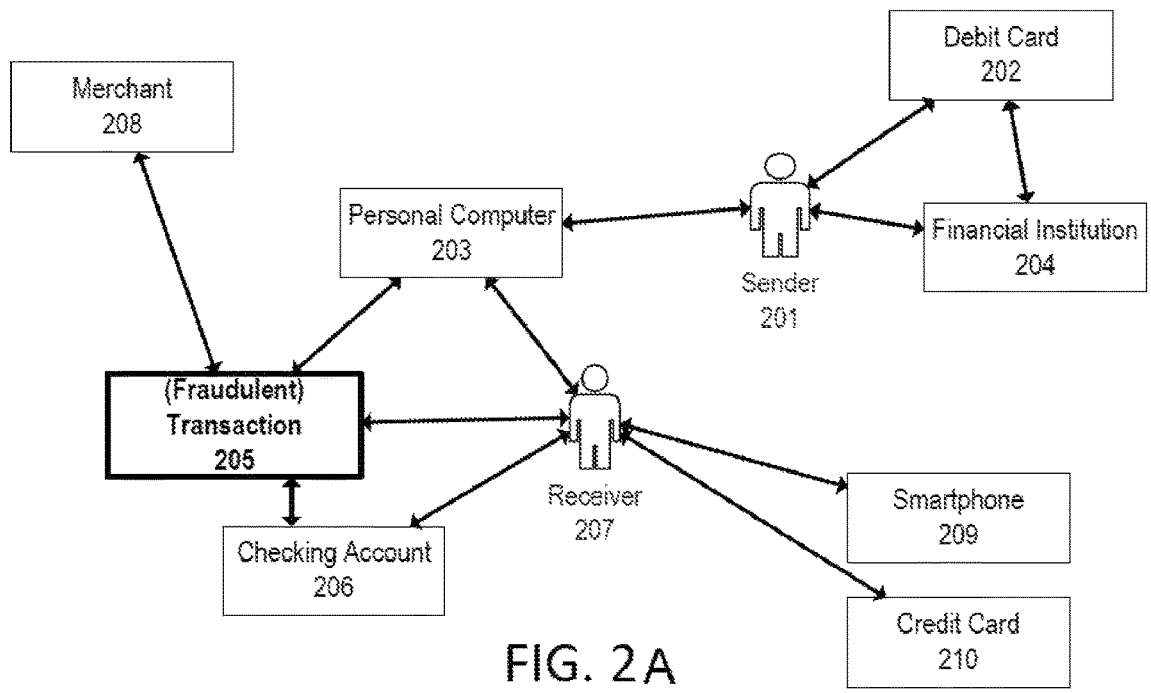
FIG. 2A and FIG. 2B (collectively referred to as "FIG. 2") illustrates a graph with nodes and edges connecting various entities in accordance with one or more examples described herein.

FIG. 2A shows an illustrative graph representation of a financial transaction. One or more financial transactions, such as a sender sending money to a receiver, may be understood in a graph form, such as that depicted in FIG. 2A. Though FIG. 2A depicts a single financial transaction, multiple transactions may be associated in a single graph. A graph representation may depict various entities, such as individuals, financial accounts and/or tools, computing devices, and the like, and the relationships between those entities. An individual, such as sender 201, may have a debit card 202 and a personal computer 203. The debit card may be issued by a financial institution 204. A transaction, such as transaction 205, may be attempted wherein the sender 201 purports to use the debit card 202 to transmit, via a website accessed using the personal computer 203, money to a checking account 206 associated with receiver 207. The transaction may be processed by a merchant 208. Furthermore, data available may suggest that the receiver 207 is associated with smartphone 209 and credit card 210.

Figure 2B:
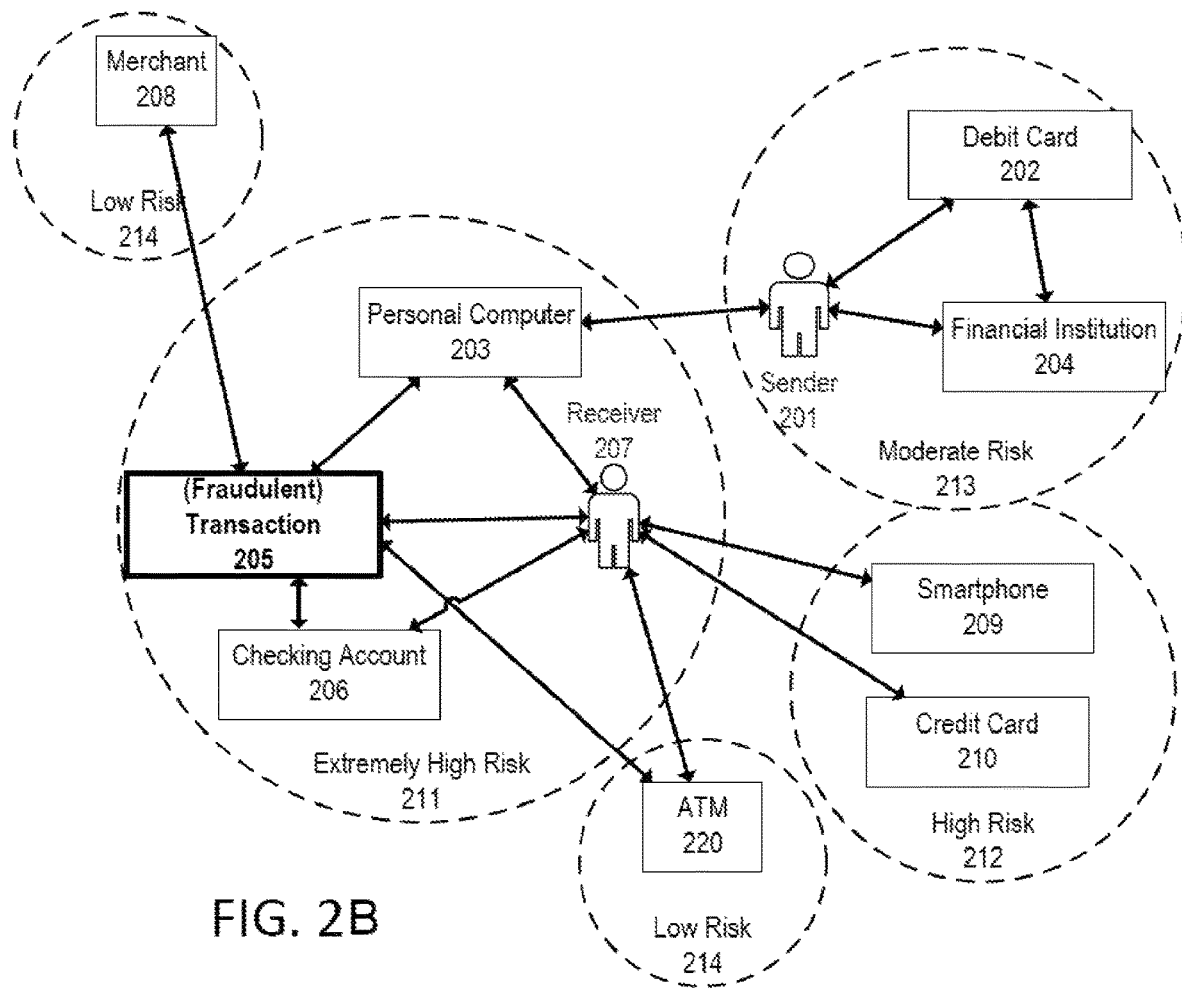

The graph representation in FIG. 2B, which has similar entities to that of FIG. 2A, illustrates how entities and relationships may be understood in the context of a fraudulent transaction, such as fraudulent transaction 215. For example, the personal computer 203 may be compromised, such that transactions originating from the personal computer 203 should be considered extremely suspect, if not per se fraudulent. As another example, the credit card 210 and the smartphone 209 of the receiver 207 may be compromised such that, though they need not be directly associated with the transaction 205, they may suggest that the transaction 205 is slightly more likely to be fraudulent.

The determination of a fraudulent transaction can have ripple effects. For example, the fraudulent transaction 205 may suggest that receiver 207, including the checking account 206, may be untrustworthy. The fraudulent transaction 205 may further suggest that the personal computer 203 has been compromised. As such, the extremely high risk group 211 indicates that the transaction 205, the personal computer 203, the checking account 206, and the receiver 207 may be of extremely high risk, untrustworthy, or the like. In turn, the high risk group 212 indicates that the smartphone 209 and the credit card 210 may be high risk by virtue of their association with the receiver 207, but slightly less so than the extremely high risk group 211 due to their lack of direct association with the transaction 205. The moderate risk group 213, which comprises the sender 201, the debit card 202, and the financial institution 204, may comprise entities related to the transaction 205 but possible victims thereof, such that they need not necessarily be considered as high of a risk as, for example, the receiver 207 or the credit card 210. The low risk group may include the merchant 208, particularly given that the transaction 205 may have little or no influence from the merchant 208. In addition, the low risk group 214 may include the ATM 220, given that the transaction 205 may have no influence from the ATM 220. In other examples, the ATM 220 and/or the merchant 208 may have some influence or may even be the source of the fraud, and they may be classified into the appropriate risk group accordingly. Though groups are depicted in FIGS. 2A and 2B, a level of risk may be determined for each entity regardless of its particular position in a graph representation.

Financial transactions such as that presented in FIG. 2B may be analyzed to determine indications that future transactions may be fraudulent. For example, personal computer 203 may have previously issued valid transactions from the United States on Monday, but may have purported to send a fraudulent transaction from *Antarctica* on Tuesday. Repeated such transactions may suggest that the unexpected relocation of a device greater than a certain distance may make a fraudulent transaction slightly more likely. As another example, debit card 202 may have been listed in an online unauthorized listing. Such a listing may make it extremely likely that future transactions originating from that card are fraudulent.

The sources of information which may be used to develop example graphs like that depicted in FIGS. 2A and 2B may be voluminous and/or contradictory, such that perfect correlations may be difficult to draw between various elements of a transaction. For example, information suggesting that the receiver 207's brother's wife's credit card was recently subject to fraud may be available, but may potentially be too attenuated for relevance to the question of whether a transaction involving the receiver 207 is fraudulent. As another example, data suggesting that the receiver 207 is associated with the credit card 210 may be unreliable, and any connection between the two may need to be discounted in view of its unreliability. As such, risk groups and/or connections may need to account for uncertainty, contradictions, and similar issues.

Though FIGS. 2A and 2B depict entities such as the debit card 202 and the personal computer 203, the sources of information corresponding to a transaction such as the transaction 205 are contemplated to be more and less granular. For example, the personal computer may have a corresponding Internet Protocol (IP) address, Media Access Control (MAC) address, and other similar information. The credit card 210 may be associated with a credit card number, personal identification number (PIN), and other similar information. For example, an IP address, rather than a personal computer, may be considered high risk. Similarly, specific models, categories, and/or types of devices (e.g., jailbroken smartphones) may be considered higher risk than others. In other examples, the transaction data may comprise merchant data (e.g., name, identifier, merchant type, Boolean value), location data (e.g., IP address, ISP, MAC address, device identifier, UUID), amount data (e.g., monetary amount, currency type, tender type (e.g., credit card, mobile payment, debit card, online payment merchant, cryptocurrency)), and/or other characteristics.

Information derived from past fraudulent transactions, like transaction 205, may be used to create fraud detection rules. Such rules may comprise a pattern recognition rule or algorithm, such that future transactions may be identified as fraudulent before, after, and/or during occurrence. For example, a fraud detection pattern recognition rule may specify that five repeated failed attempts at withdrawing money from an Automated Teller Machine (ATM) may suggest that the debit card used in the failed attempts is presumptively stolen. Similarly, rules indicating that a transaction is more likely may exist. For example, a transaction at a store selling only $3 items may be marginally more valid of the transaction amount is a multiple of $3 plus tax.

Such rules may be designed for a time period, specific geography, or other similar limitation. For example, a pattern recognition rule may be limited to a period when an event (e.g., a sale on the day after Thanksgiving day) is occurring. As another example, a pattern recognition rule may require modification or may cease to apply where the rule was associated with a store that has closed. As such, as illustrated in FIG. 6, rules may be configured to gradually decay in effect or expire over time unless re-established.

The graph representations depicted in FIG. 2 are exemplary and may be formatted in a variety of structures. A graph representation may be formatted as a self-organizing map (SOM), also known as a self-organizing feature map (SOFM). Such maps may be a two-dimensional representation of multi-dimensional data, and may be viewed as an array of shapes (e.g., squares). For example, the graph representations depicted in FIG. 2 may be depicted as a grid of squares, with each entity mapped to a different square located in proximity to other entities based on their association. Such entities need not be placed manually, but may be interrelated using a machine learning algorithm.

Figure 4A:
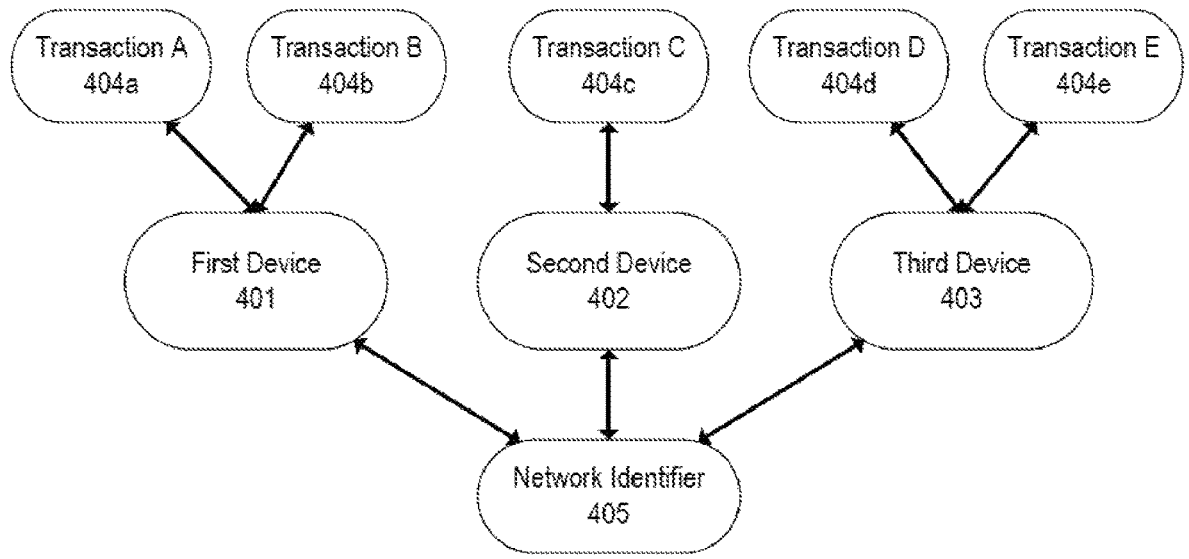
FIG. 4A and FIG. 4B (collectively referred to as "FIG. 4") show a diagram of a network identifier linked to the devices on that network and associated transactions, in accordance with one or more examples described herein.

In another example, FIG. 4A shows an example graph representation of multiple transactions involving multiple devices associated with a similar network identifier. A plurality of devices, such as a first device 401, a second device 402, and a third device 403, may all be involved in a variety of transactions. For example, as shown in FIG. 4A, the first device 401 is associated with a transaction A 404*a* and a transaction B 404*b*, the second device 402 is associated with a transaction C 404*c*, and the third device 403 is associated with a transaction D 404*d* and a transaction E 404*e*. The first device 401, the second device 402, and the third device 403 are all associated with a network identifier 405. The network identifier 405 may be an IP address, all or a portion of a MAC address, an identifier of a particular network (e.g., the Service Set Identifier (SSID) of a wireless network, such as an 802.11 wireless local area network), or a similar indication of all or portions of a network.

Figure 4B:
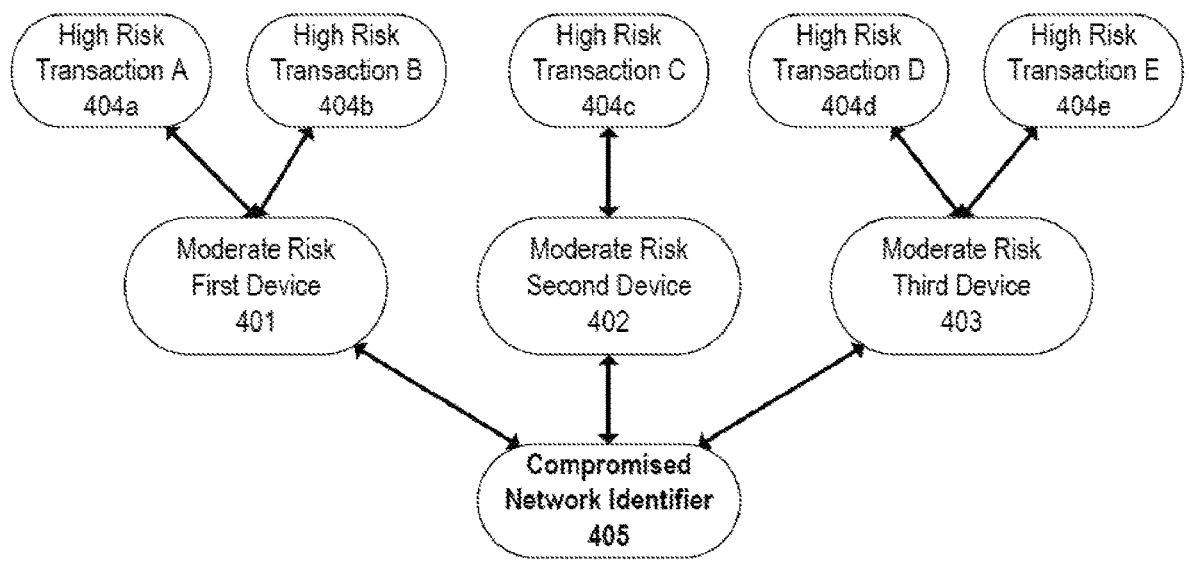

FIG. 4B shows yet another example graph representation of multiple transactions involving multiple devices as FIG. 4A, except the network identifier 405 is indicated to be compromised. The network associated with the network identifier 405 may be compromised if, for example, a packet sniffer is detected on the wireless network, an IP address is associated with one or more fraudulent transactions, or other similar events or determinations which may indicate that the network identifier 405 is not to be trusted. The risk associated with the network identifier 405 may flow to the first device 401, the second device 402, and the third device 403, such that all may be considered a moderate risk. Similarly, all transactions depicted in FIG. 4B (transactions 404*a*-404*e*) may be considered high risk. The devices may be considered a moderate risk because they may be mobile and not directly connected to the network (e.g., the devices may be smartphones and the network may be a public wireless network), but the transactions may be considered a high risk because the transactions may have used the compromised network.

In FIG. 3, building upon the graph structure illustrated in FIG. 2 and FIG. 4, the machine learning system illustrated in FIG. 6, for example steps 616, 618, and 624, among others, may calculate and propagate restrictions to entities in the graph structure.

Figure 3A:
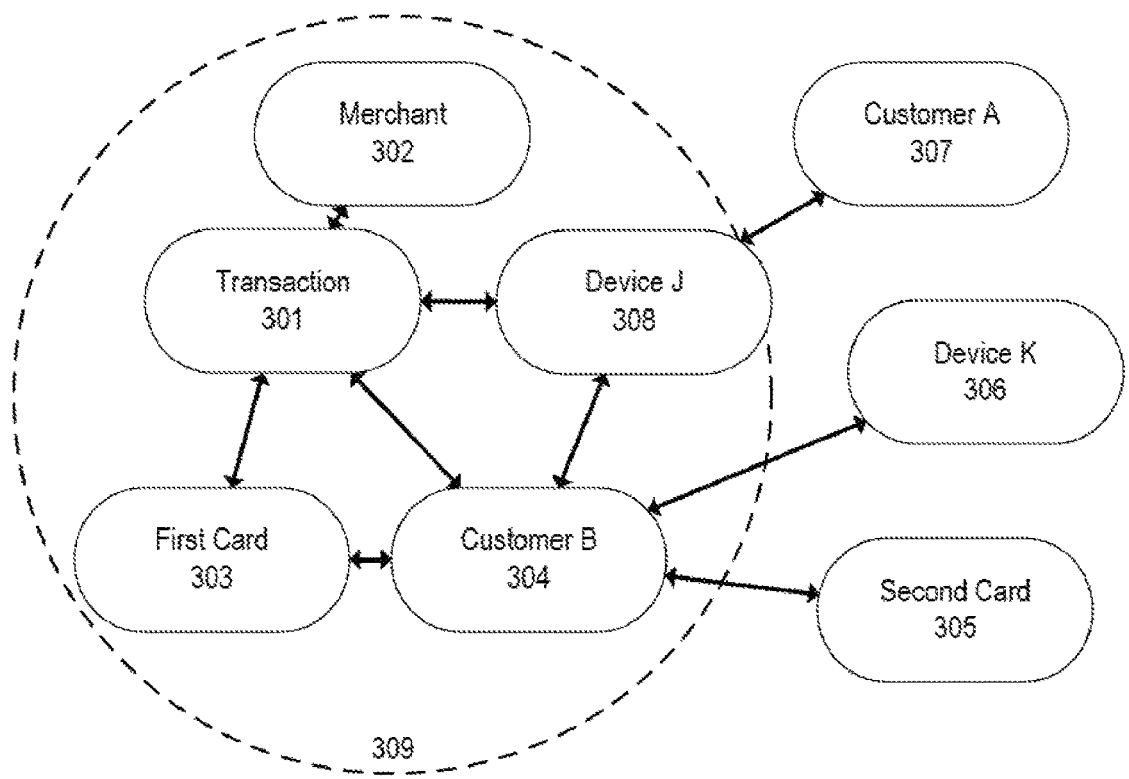
FIG. 3A, FIG. 3B, and FIG. 3C (collectively referred to as "FIG. 3") illustrates a graph with nodes, edges, classifications, and confidence values in accordance with one or more examples described herein.

For example, FIG. 3A depicts another example of a graph representation of a financial transaction. A transaction 301 is associated with a merchant 302, a first card 303, a customer B 304, and a device J 308. The device J is associated with a customer A 307. The customer B is associated with a device K 306 and a second card 305. The entirety of the transaction may be combined into a group of entities immediately involved in the transaction (e.g., a group 309). As an example, the transaction depicted in FIG. 3A may be a purchase of a coffee at a coffee shop operated by the merchant 302, wherein the customer B 304 uses the first card 303 to purchase the coffee in transaction 301 using the device J 308, which may be a point-of-sale system. The device J 308 may have been used previously by another customer, such as the customer A 307, to purchase a donut. The customer B may also have another credit card (e.g., the second card 305) and may have a smartphone (e.g., the device K 306).

Figure 3B:
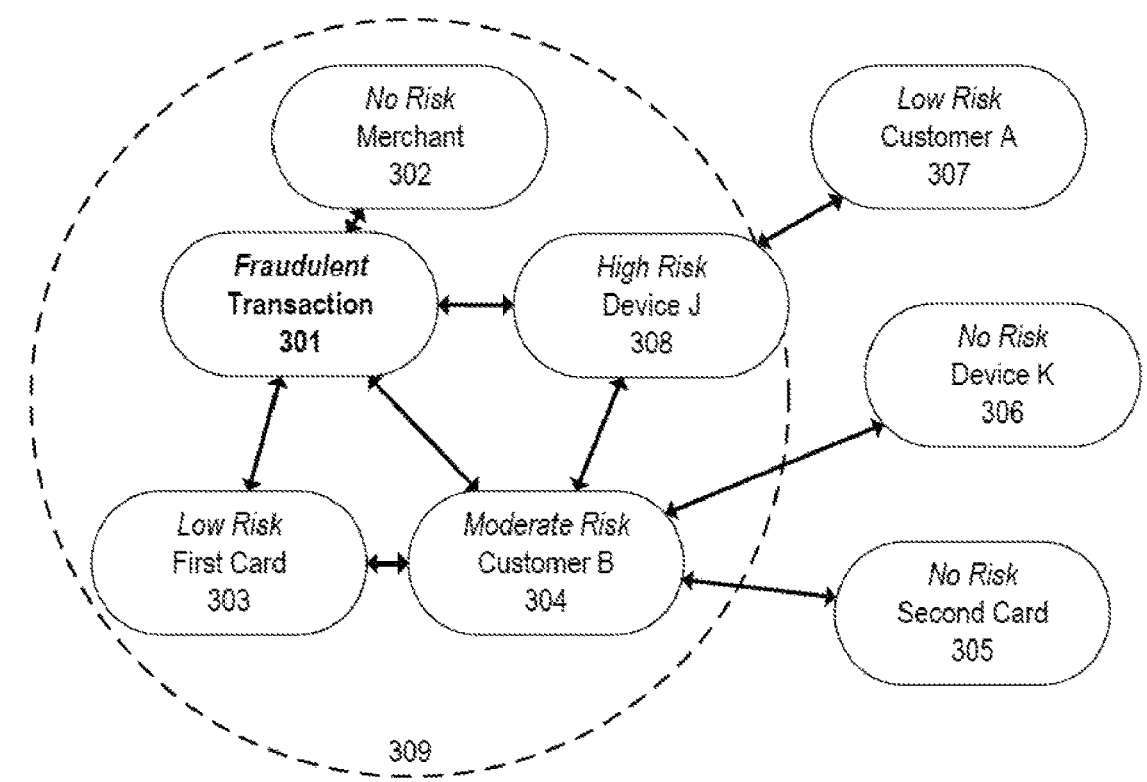

FIG. 3B shows a similar example of a graph representation of a transaction as FIG. 3A, albeit in the context where the transaction 301 is fraudulent due to a compromised point-of-sale system at a coffee shop run by the merchant 302. The risk associated with the transaction 301, determined fraudulent, may implicate associated risks with other entities depicted in FIG. 3B. The spread of risk to different entities may be based on the likelihood that each entity is related to the fraudulent transaction. For example, the device J 308, in the example above a point-of-sale system, may be compromised. As such, the device J 308 may be considered to have a high risk. Relatedly, the customer B 304 may be considered to have a moderate risk, as a fraudulent transaction may indicate that, for example, the customer's private data has been stolen via the compromised point-of-sale system. The first card 303 may be considered low risk in this example due to, for example, the nature of the transaction (e.g., the transaction indicating that the point-of-sale system has been hacked but did not exfiltrate card data), but the first card 303 may be categorized as high risk if, for example, the transaction 301 suggested that the first card 303 was compromised. The merchant 302 may be considered low risk because it may, for example, be a national coffee chain unlikely to be directly participating in any fraudulent transactions and may be equally a victim of the compromised point-of-sale system. The customer A 307 may be considered low risk because of their association with the potentially compromised point-of-sale system (that is, the device J 308), but not as high risk as the customer B 304 because their transaction may have been before the point-of-sale system was likely compromised. The device K 306 and the second card 305 may be considered low risk because of their distant relation to the transaction 301 and lack of direct involvement with the compromised point-of-sale system.

As shown in FIG. 3B, an entity need not be directly related to a transaction in order for risk to spread to that entity. For example, the customer A 307 may be considered low risk by virtue of the transaction 301 despite not being involved in the transaction. After all, the determination that the point-of-sale system (e.g., the device J 308) may be compromised may have implications on former or future transactions and/or entities associated with the point-of-sale system.

Figure 3C:
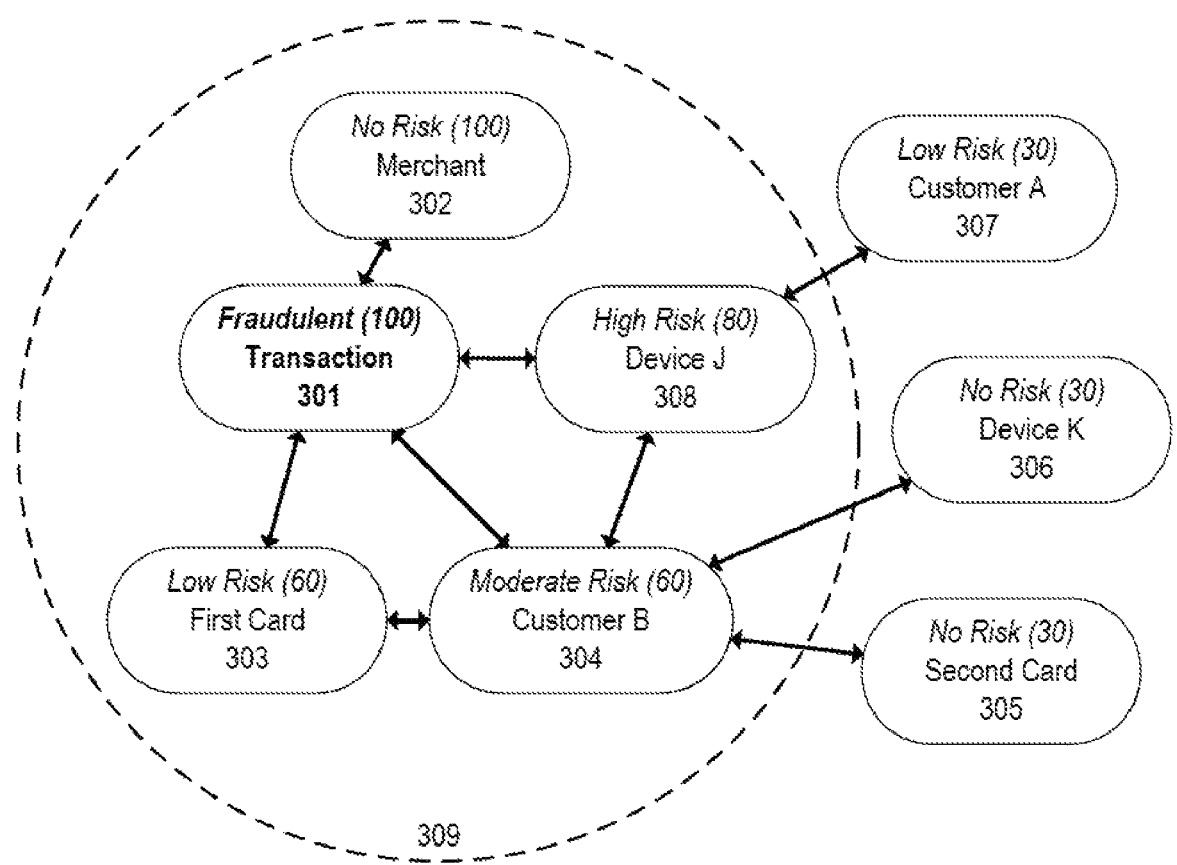
Figure 5:
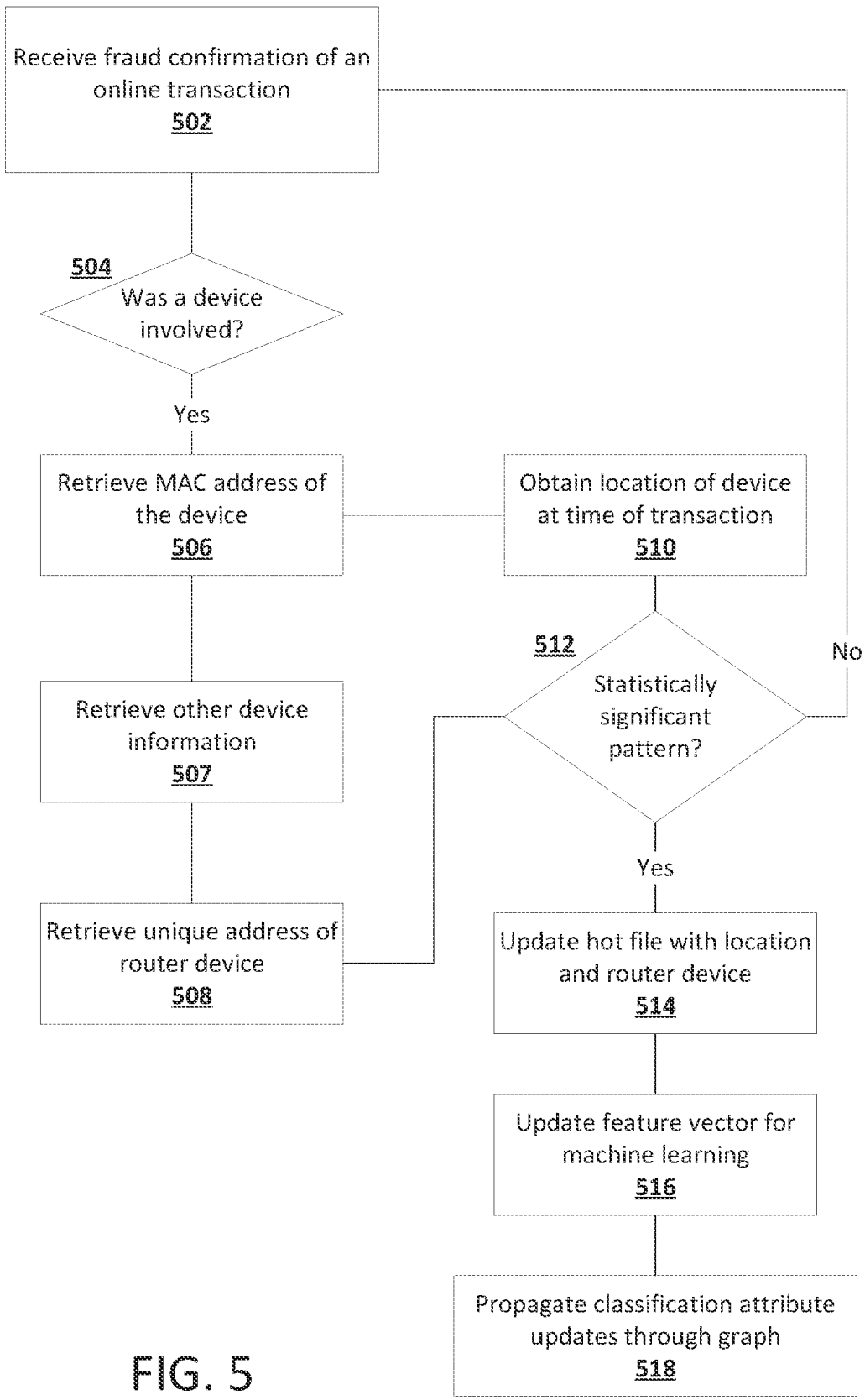
FIG. 5 describes a flowchart of steps performed in accordance with one or more examples described herein.

FIG. 3C illustrates how the steps in the flowchart of FIG. 5 may be implemented on the machine learning system of FIG. 6. In comparison to FIG. 3B, in FIG. 3C includes a confidence attribute (shown in parentheticals with a numeric value) corresponding to the nodes in the graph structure. The confidence attribute reflects the confidence with which the machine learning system predicts the classification attribute of the node 301, 302, 303, 304, 305, 306, 307, 308 in the graph structure. Although FIG. 3C illustrates each and every node in a graph with an assigned confidence attribute, in some examples, the machine learning system might not assign a value to the confidence attribute. In one example, a confidence attribute may range in a numeric value from 0 to 100, with 100 being the most confident and zero meaning no confidence in the value assigned to the classification attribute for that particular entity in the graph structure.

For example, with reference to the illustrative flowchart in FIG. 5, in step 502, the machine learning system may receive transaction data and non-monetary data. In step 502, the aforementioned data may include a positive affirmation that a fraudulent transaction has occurred in an online environment by way of a telephone conversation with the account holder. Because the fraudulent transaction involved an electronic device, in step 504, the system proceeds to step 506. The electronic device may be device J, 308 illustrated in FIG. 3C. The system may, retrieve the MAC address in step 506 (and/or other device information in step 507) of the electronic device. If the electronic device is connected to a computer network through a router device (e.g., device K, 306) then the unique identifier (or address) of the router device may be retrieved in step 508. The location of the electronic device may be derived through the identification of the router device. Alternatively, if the electronic device is not connected to a router device, the location of the device at the time of the potentially fraudulent transaction may be obtained in step 510. The location may be obtained in step 510 using a GPS receiver or other technique, such as cellular triangulation.

Once the data has been retrieved and analyze in steps 506, 508, and/or 510, if it results in a statistically significant pattern being detected in step 512, then in step 514, a hot file may be updated with one or more of the aforementioned location and/or router device. The hot file may be stored in a hotfile module 704, as illustrated and described below with respect to FIG. 7A. In step 516, the system may update a feature vector used with the machine learning system to, among other things, refine the machine learning model to more accurately and with higher confidence, identify a classification attribute for nodes in the graph 309. Moreover, a hotfile propagation engine 706, as illustrated and described below with respect to FIG. 7A, may propagate a classification attribute through linked nodes in the graph structure. For example, device J, 308 may be initialized as a node in the graph structure with a classification attribute of "low risk" and a confidence score of 100, then through propagation of heat through the linked nodes in the graph structure, the classification attribute of the node 308 may increase to "moderate risk," but the confidence score may drop to 60. The confidence score is calculated by the machine learning system and reflects the estimated accuracy of the machine learning models prediction. However, in one example, once a node 301 adjacent to the device node 308 is confirmed to be a fraudulent transaction, then the confidence value of the device node 308 may be increased to 80, and the classification attribute updated to "high risk" to reflect the precarious riskiness of the transaction 301 and the platform on which the transaction 301 was performed. Nevertheless, other nodes, for example a merchant node 302, adjacent to the fraudulent transaction node 301 may remain at a classification attribute of "no risk" with a confidence value of 100 if the machine learning model predicts that there is on statistical relationship between the two entity types—that is, just because one user's smartphone device was compromised and then used to execute a fraudulent transaction on a merchant's website does not mean that all users trying to make a purchase on that merchant's website are a higher risk of fraud. The machine learning system, through iteration and back propagation, as illustrated in FIG. 1, may refine its model to identify appropriate propagation paths and discount other links between nodes.

Referring to FIG. 6, the machine learning system calculates and assigns, in step 612 and step 614, one or more customized functions to nodes in the graph structure based on the entity type of the node. For example, five hot file functions that may be implemented on the graph structure include, but are not limited to: detect, label, spread, fade out, and restrict. As previously described, a series of human-designed pattern recognition rules, which are sometimes referred to as "hot files," may be used to detect fraud in, for example, banking transactions. At initialization, hot files may, in some examples, be provided and/or designed manually by a human. Although the term "hot file" or "hotfile" is used in this specification, it is not intended to mean just a rule-based system that simple reacts through manual human intervention. Rather, as illustrated in FIG. 6, the coupling of a machine learning with a graph structure, which stores nodes and edges representing transaction data, creates an automated machine learning system that is at least a technological improvement over prior, manual hot file methodologies.

Figure 7A:
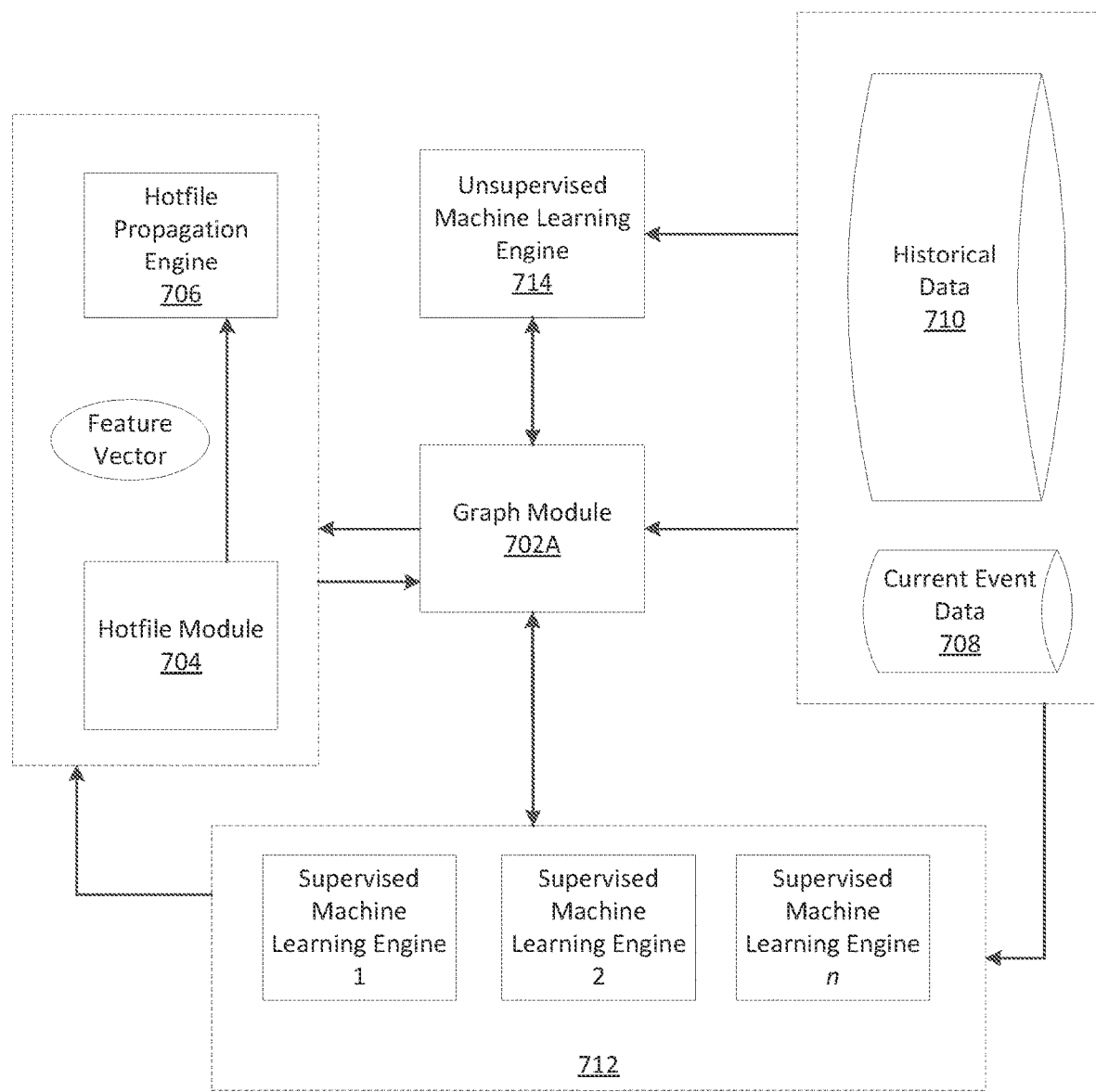
FIG. 7A, FIG. 7B, and FIG. 7C (collectively referred to as "FIG. 7") illustrate some components interacting in a machine learning system communicatively coupled to a graph structure in accordance with one or more examples described herein.
Figure 7B:
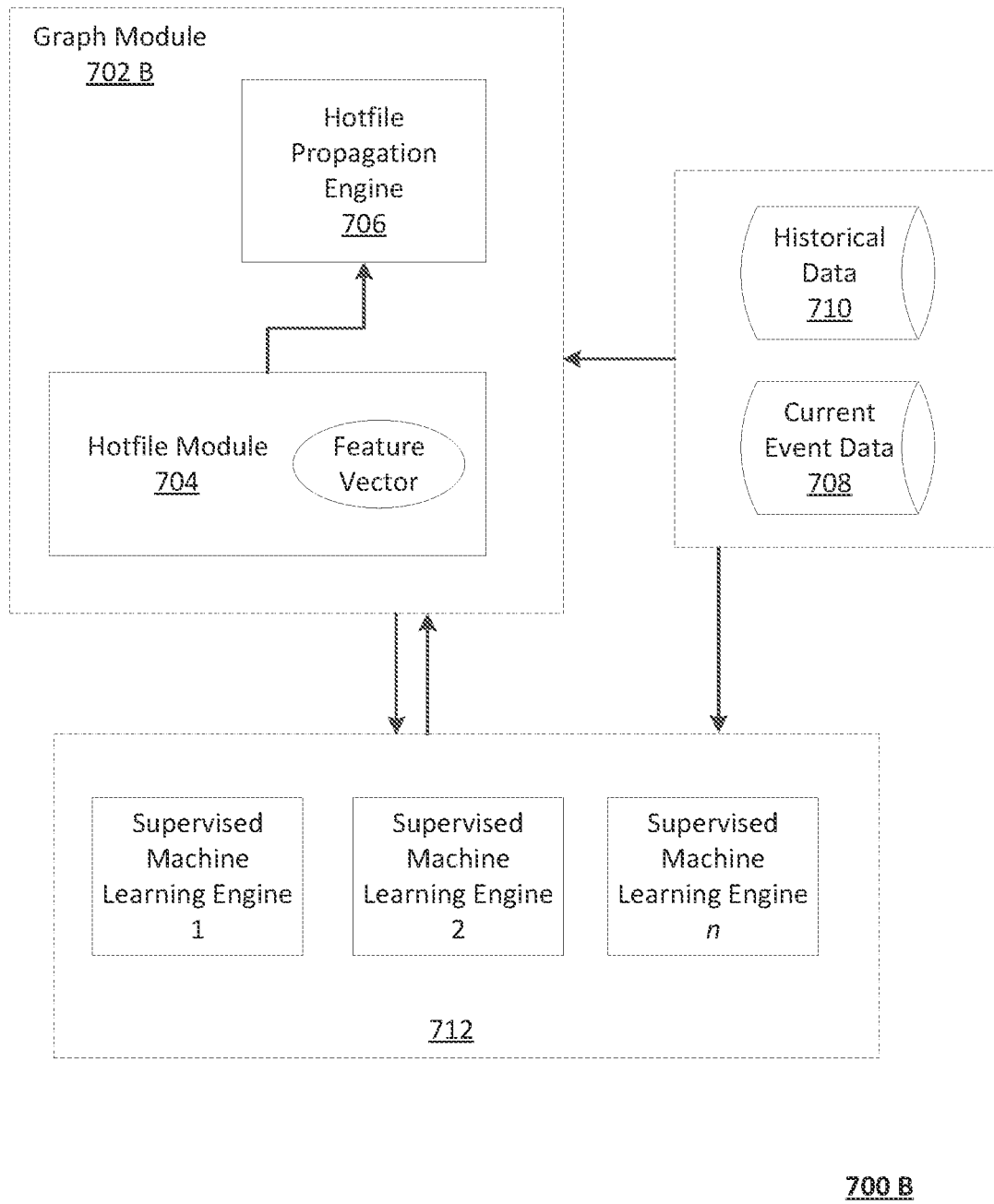

For example, as illustrated in FIG. 7A, one or more machine learning engines 712 in the system are coupled to the graph structure (e.g., through a graph module 702A) to automate hot file functions such as detecting, labeling, spreading, fading/wearing out, and restricting. The graph module 702A may comprise or be communicatively coupled with a plurality of engines for performing functions on nodes (e.g., entities) represented in the stored graph. In one embodiment, the graph module may communicate with a hotfile module 704 and/or hot file propagation engine 706 to cause those components to execute desired functions on the graph structure. In another embodiment, as illustrated in FIG. 7B, the graph module 702B may include computer-executable instructions for each of the plurality of engines corresponding to a function. Alternatively, the plurality of engines may be distributed across one or more computing machines communicatively coupled with the graph module.

In FIG. 7A, the system may assess, as explained in step 612, the heat value (or risk score) of each node involved in a transaction. A hotfile module 704 and/or hotfile propagation engine 706 may assess the transaction data, and then the hot files/warm files may be calculated for the appropriate nodes in the graph structure. The transaction data may be filtered through a machine learning model, as illustrated in FIG. 1, of the one or more machine learning engines to determine an output based on the various inputs generated by the transaction data.

For example, the hotfile propagation engine 706 may comprise computer-executable instructions corresponding to a detect function for a hot file. This detect engine may evaluate a new node being introduced into the graph structure as part of the data for a new transaction. The detect engine may, in one example, receive supervisory input to flag a node as hot. In that case, the detect engine may simply serve as an interface between a graphical user interface (GUI), for example on a user computing device 720, and the graph module so that a user may train the machine learning model. The supervisory input trains the supervised machine learning engine 712. In one example, the detect engine may input values into a machine learning model, as illustrated in FIG. 1, to predict the outcome of various data fields in the incoming transaction data. This outcome may then be sent to a label engine to update the graph structure accessible through the graph module.

A label engine may store and/or execute in a hotfile module 704 and/or hotfile propagation engine 706. The label engine may label a new node in the graph structure by, among other things, assigning the appropriate entity type to the node and connecting (or linking) the new node to the appropriate, existing nodes in the graph. The label engine may, in some examples, also assign one or more appropriate functions to the newly created edges in the graph, as described in step 614. For example, a node corresponding to transaction data may be associated with a node corresponding to a user's mobile device if, for example, the user paid using near field (NFC) technology embedded on the user's smartphone. Architecturally, the label engine may be divided into separate engine or consolidated into a single engine being run on a single machine.

Figure 7C:
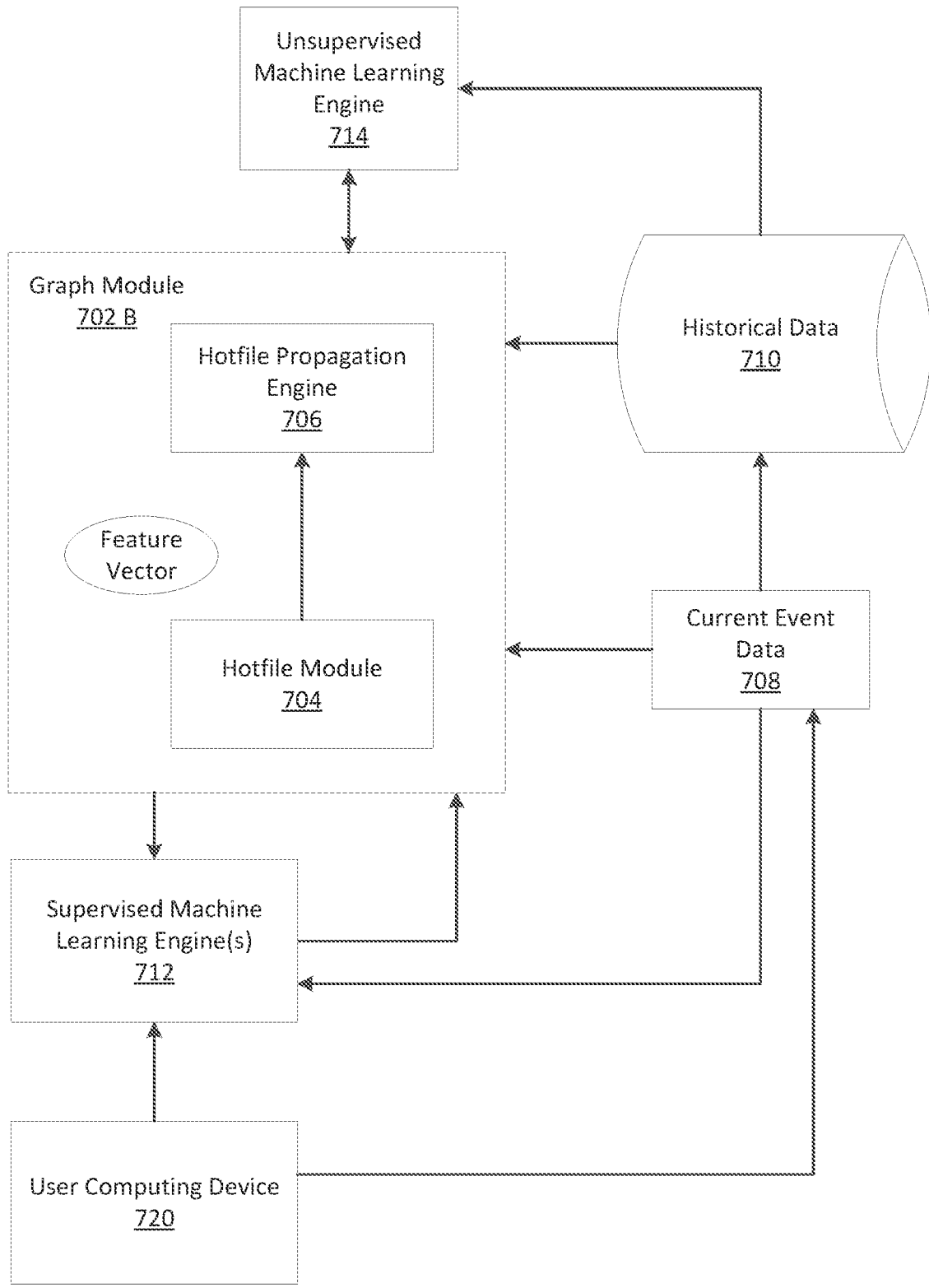

In yet another example of the label engine, the label engine may send transaction data to the machine learning model to determine whether to expand or adjust a feature vector to obtain more precise predictions of outcomes. A feature vector, as illustrated in FIG. 7, assists the machine learning system 700A to obtain more precise analysis and predictions of the classification attribute to assign to a node in the graph. The label engine may also assign a value to the classification attribute of a node. In one example, the feature vector is an n-dimensional vector of numerical features that represent an entity in a graph. The feature vector may comprise features including one or more of the following features: a hardware identifier assigned to the device originating the transaction data, a phone number (or ANI) corresponding to the device originating the transaction data, a unique identifier assigned to a cookie corresponding to the transaction data, an email address, the email domain or subdomain, a screen resolution of the device, the IP address of the device, the internet service provider (ISP) of the device, the unique vendor identifier of the device, the name of the device, the SSID of the network to which the device was connected, a unique device fingerprint generated using a proprietary or non-proprietary algorithm, whether the device accepts encoding (e.g., gzip deflate), the geography (e.g., longitude, latitude) of the device, the city/state of the device, the zip code of the device, or another feature associated with the transaction data or the user. For example, another feature of the feature vector may be the employer of the user (e.g., account holder). As such, as other account holders are added that share the same employer (or employer information), then they may be associated by the machine learning system. Feature vectors facilitate processing and statistical analysis because in some examples, the machine learning systems are based on numerical representations of corresponding items. Then the feature vector is coupled to weights using a dot product to construct a linear predictor function that may be used to determine a score (e.g., a confidence score) for making a prediction. In addition, feature construction techniques may be used to increase the accuracy and/or understanding of a feature vector. Through feature construction, a set of new features may be created and added to the feature vector using constructive operators on the existing set of features. Moreover, with the transaction data 708 and historical data 710 being voluminous, a feature vector assists in making the machine learning systems 700A, 700B, 700C more efficient by reducing the number of parameters separately analyzed by the machine learning system.

In some examples, a neural network, as illustrated in FIG. 1, of the machine learning system may take as input the one or more feature vectors described in FIG. 7. The feature vectors may be split into different groups such as a training set, a validation set, and a test set. Accordingly, in one example, the machine learning system may be provided with two distinct sets of data: a first set of training data with which the nodes and edges are reconfigured to effectuate machine learning while making decisions, and a test set of data with which the nodes and edges both learn and make decisions. The training data may be labeled (e.g., the training data may indicate the correct output for the computational graph to produce) such that learning may be better effectuated. Until processing the full set of training data, the machine learning model may produce unreliable or unexpected output when provided test data. Accordingly, it may be desirable to provide the largest and most fully labeled set of training set of data possible in order to achieve the best output with the test set of data.

An example of the aforementioned computational graph may be as follows. An initial node configuration may be established. Then, the initial node configuration may be provided with a large set of training data comprising images of dogs and/or cats. The large set of training data may not be labeled, such that the images do not indicate whether the subject depicted is a dog and/or cat. The graph module may be provided an indication of whether it correctly identifies a cat and/or dog from any given image. Based on the indication, the graph module 702B may reconfigure nodes and/or edges. Over time, the computational graph may become better at identifying dogs and/or cats, which may result in smaller and fewer changes to the computational graph. The output may be measured for accuracy, such as through a confidence score. After the accuracy reaches a predetermined threshold, the computational graph may then be provided a large set of test data comprising pictures of dogs and/or cats, but without an indication of whether it correctly identifies a dog and/or cat.

In addition to the detect engine and label engine, the hotfile module 704 and/or hotfile propagation engine 706 may also include a spread engine that executes automated processes/functions on graph representations of entities. The spread engine is responsible for the spread functionality of the hot file. The inputs to the hot file functions may be, in one example, determined by a supervised machine learning engine 712. Risks from one entity node may spread or propagate to other entity nodes that are interconnected with the entity at risk. Machine learning may be used to identify which of those entities for which to spread the risk. A lifecycle management process may be used to modify hot files and adjust risk levels. The spread engine may distribute the outcome of a new node (or an existing node with an updated heat value) outwards through adjacent edges per predefined machine learning rules formulated by the machine learning system 700A, 700B, 700C.

For example, in step 616, the machine learning system may determine whether to propagate hot file functions to other nodes linked to the effected entity. The hot file propagation engine 706 may use a machine learning model that has been trained on historical data 710 to determine whether the entities connected to the node should be updated by the spread functionality of the hot file. In one example, the spreading may occur recursively. Each node may contain a function to update its hot file outcome; alternatively, the spread may occur using an iterative process.

In another example, the spreading functionality may occur based on temporal considerations. For example, if the machine learning engine 712 outputs a Boolean true outcome for a new node being added to the stored graph, a node corresponding to a merchant device that received the transaction may be flagged for additional scrutiny. That merchant device corresponds to a particular node in the graph module. All transactions that occurred at the merchant device node in the graph module for a threshold of time T may receive a slightly weighted hot file value. In one example, the weighting may be calculated to decay as time reaches a threshold of time T.

In addition to the aforementioned hot file functionalities, the hotfile module 704 and/or hotfile propagation engine 706 may also include a fade/wear out engine that is responsible for the fade out functionality, as shown in step 628, of the hot file. The fade engine may be coupled with one or more timer or clocks and may adjust the outcome resulting from a node based on a temporal variable. The adjustments may be in a downward/decreasing direction, but in some examples, the adjustment may be to increase the heat of the node. For example, hot files can fade/wear out and risk associated with hot files may decrease over time (e.g., time, speed, and other conditions) may be satisfied to perform a wear out process on the classification attribute and/or confidence score of the node. Various restrictions may be associated with a hot file—for example, a node (e.g., a user or device) might be prevented from accessing online banking or some other service. However, a decay function (or fade out function) may be used to adjust the heat of the node as a function of time elapsed or other condition. In other examples, the decay function may be based on another variable in addition to, or even in lieu of, a timer variable. For example, a node with an outcome of Boolean true may be restricted and the system might not update the node's outcome to a Boolean false value until receiving a manual user input clearing the node of the restriction or heat.

In addition to the aforementioned hot file functionalities, the hotfile module 704 and/or hotfile propagation engine 706 may also include restriction functionality, as illustrated in step 626. The restriction functionality may be implemented by a restrict engine in the hotfile module 704 and/or hotfile propagation engine 706. The restrict engine may output whether to block or not block a putative transaction. In the case of a completed transaction, the restrict engine may analyze the transaction data as compared to the existing graph structure to determine whether any ex post facto alerts or flags may be desirable. A hot file restrict engine may, for example, cause a device, which correspond to a node in the graph, to deny a transaction involving a particular entity (e.g., modify permissions) associated with the restriction. In step 624, a hot file level may be a characterization of one or more hot file restrictions, a weighting of one or more hot file restrictions, or some other manner in which the strength of a hot file may be characterized or quantified. Expiration of a hot file may result in one or more restrictions corresponding to a hot file being lifted. Alternatively, a restriction might be lifted if manual user input is received from authorized personnel to clear a previous restriction on a hot file. For example, in the case of a credit card that might appear to have been used for a fraudulent transaction, a card holder may submit through a user computing device 720 a confirmation of the authenticity of the transaction. The confirmation is received as current event data 708 in the machine learning system 700C, which then results in an immediate lifting by the restrict engine.

Regarding FIG. 7, the hotfile module 704 and hotfile propagation engine 706 may be configured in different orientations to further the design and implementation of various features. For example, in FIG. 7A, the graph module 702A may store the graph structure in its computer memory, but the hotfile module 704 and hotfile propagation engine 706 are separately communicatively coupled to the graph module 702A. Meanwhile, in FIG. 7B, the graph module 702B may comprise the graph structure and also the the hotfile module 704 and hotfile propagation engine 706. Furthermore, one or more of the engines described herein as implemented using the hotfile module 704 and/or the hotfile propagation engine 706 may be combined into a consolidated engine, or divided into additional separate engines. In some embodiments, the graph module, the hotfile module 704, and hotfile propagation engine 706 may be consolidated into a single component that provides all of the services described herein.

Meanwhile, in other embodiments, the components described in FIG. 7 may be distributed in an environment with graphics processing units (GPUs) and/or NPUs and distributed data stores to accommodate a large quantity of transaction data. GPUs are computer hardware devices that contain a network of hundreds or thousands of computational layers in the form of highly parallel single input multiple data (SIMD) processors, similar to the depiction in FIG. 1. These layers are organized to be conducive to running deep learning algorithms. Deep learning can also be executed using neural processing units (NPUs) that are optimized for artificial intelligence (AI) in hardware to handle dot product math and matrix operations using lower precision numbers. Unlike GPUs, which allocate compute resources on demand to service graphics and AI workloads to minimize idle time, NPUs are dedicated to just one task—AI processing.

In an embodiment involving supervised machine learning, a graph module may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

In some examples, the machine learning engine may identify relationships between nodes that previously may have gone unrecognized. For example, using a collaborative filtering technique, the machine learning engine may identify that a node representing a transaction should be connected to the user's employer, which is an attribute of the user (i.e., the purchaser in the transaction). The machine learning engine may have identified that other transactions involving purchasers that identified the same employer have also recently been recognized with anomalous patterns indicative of a hot file. This realization by the machine learning engine may increase the heat of the transaction node; and subsequently spread to connected nodes. This may result in particular nodes exceeding a threshold confidence to push those nodes to an updated outcome from a Boolean false to a Boolean true. Other examples of machine learning techniques may be used in combination or in lieu of a collaborative filtering technique included, but are not limited to a fraud detection model, any time series trend analysis, and the like.

Regarding unsupervised anomaly detection, a unsupervised machine learning engine (UMLE) 714 may take as input a graph generated by the graph module 702A, 702B. The UMLE may construct unsupervised feature vectors using the graph for use in an unsupervised machine learning algorithm. For example, each node and its associated edges may be converted into a feature vector. An unsupervised feature vector may include data we know about each entity, such as data from historical data 710, current event data 708, and transaction data. An unsupervised feature vector may also include a score output by the entity's associated supervised machine learning engine for that entity. The score may represent the classification attribute of the node, or may be the confidence score of the node. The feature vector may also include current event data. For example, the feature vector may include data related to recent transaction data that the corresponding entity was a party to. The UMLE may use the unsupervised feature vectors in a machine learning algorithm to detect anomalies within the graph. The UMLE may use any machine learning model to detect anomalies within the graph including support vector machines, isolation forest model, and other techniques.

For example, the UMLE may use a clustering technique to cluster the unsupervised feature vectors to determine whether any of the entities are exhibiting unusual behavior. The UMLE may use any clustering algorithm (e.g., K-means, affinity propagation, mean-shift, spectral clustering, Ward hierarchical clustering, agglomerative clustering, density-based spatial clustering of applications with noise (DBSCAN), Gaussian mixtures, Birch, shared nearest neighbors, etc.). The clustering algorithm may use a distance metric such as Euclidean distance, Manhattan distance, cosine distance, etc. to determine distances between unsupervised feature vectors when clustering.

UMLE may determine that some clusters are fraudulent because of their differences from other clusters. The UMLE may also identify individual entities that are anomalous. For example, in a shared nearest neighbor clustering, entities that are marked as noise entities (entities that do not belong to any cluster) may be flagged as anomalous so that they can be investigated for potential fraudulent activity.

For example, using unsupervised machine learning techniques, the UMLE may determine that a group of fraudulent credit cards were issued where the provided employer name, address, and phone number share similar characteristics (e.g., the fraudster(s) all setup an unverified employer with a Google phone number to verify their fake income). The UMLE may identify these fraudulent credit cards because they are outliers when compared with the rest of the entities in the graph. The UMLE may link all of these credit cards together so that if another entity tries to open a future credit card with similar employer name, address, or phone number characteristics, then the system may propagate the heat from the confirmed nodes to the new card nodes in the graph. Similarly, once the UMLE defines this as another feature of interest, then in the future, all nodes would be linked/connected with an edge if they share the same and/or similar employer attributes. For example, an entity type called "employer," that stores the shared attribute values may be added to the graph, and linked with edges to each of the matching card-type nodes. As a result, as a statistically significant number of card-type nodes report fraudulent transactions, the heat from these nodes increases and spreads through edges to adjacent nodes. One such node will be the employer-type node that will rapidly increase in heat through its connection with multiple card-type nodes reporting fraud. And with each iteration of the machine learning system coupled to the graph module, the employer-type node will spread its increasing heat to connected nodes through their respective edges. For some edges, the propagation function by which heat spreads between a pair of node types may limit the amount of heat that spreads from the employer-type node to the connected node.

In another example, the UMLE may use an autoencoder technique to detect anomalies within the graph. The autoencoder may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation.

The autoencoder may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the UMLE may flag the feature vector as potentially fraudulent.

The autoencoder may be a variational autoencoder, in some examples. The variational autoencoder may include the components of the autoencoder. The variational autoencoder may also include a constraint on its encoding network that forces it to generate vector representations of inputs according to a distribution (e.g., a unit Gaussian distribution).

A graph representation of entities and relationships may be analyzed by an unsupervised machine learning model. As discussed in greater detail above, an unsupervised machine learning model may be used to determine, among other things, correlations in data sets without external feedback (e.g., a score associated with machine learning output). Such an unsupervised machine learning model may be executed on a graph representation of entities and relationships in order to determine, for example, how a characterization of one entity (e.g., a determination of a flaw or error in one entity) may spread to other entities.

An unsupervised machine learning model may analyze one or more transactions to determine how a characterization of one or more entities may spread across entities. A characterization may comprise, for example, an indication of a flaw, error, or risk associated with one or more entities. Based on analysis of historical graph representations, an unsupervised machine learning model may determine that a quantity associated with a first entity suggests a corresponding quantity associated with a second entity. For example, if a router has a high likelihood of being compromised, a laptop connecting to the Internet through the router may have a respective likelihood of being compromised. As another example, the likelihood of one member of a family being sick suggests that other members of the same family have a relatively higher likelihood of being sick as compared to the general population. In other words, a first value associated with and/or characterization of a first entity may spread to associated entities in a graph representation.

An unsupervised machine learning model may analyze a graph representation using definitional functions. Definitional functions may comprise, for example, a definition of the relationship between two entities (e.g., a user and a personal computer) and/or the definition of an entity (e.g., networks commonly used by a particular device). A definitional function may be, for example, descriptive (e.g., describing a characteristic of a device), quantitative (e.g., describing numerically the degree of similarity of two devices), and/or qualitative (e.g., describing the significance of a device being compromised by a hacker).

An unsupervised machine learning model may use definitional functions defining an entity to determine how risk may originate and spread with regards to the entity. A graph representation may comprise a first entity that is a laptop and a second entity that is a smartphone. Whereas the laptop may have certain features (e.g., an Ethernet port), the smartphone may have different features (e.g., cellular communications capabilities). Both the laptop and smartphone may share certain features (e.g., an operating system, a processor, memory).

A definitional function may influence how an unsupervised machine learning model interprets a quantity and/or characterization involving an entity. For example, a definitional function may indicate that large computers built with Advanced Technology eXtended (ATX) motherboards are difficult to transport. As such, the unsupervised machine learning model may use this definitional rule, in conjunction with input data, to determine that risk is marginally more likely when a large computer in a first location unexpectedly purports to conduct transactions in a second location.

An unsupervised machine learning model may use, as input, definitional functions defining the relationship between two entities to determine how risk may spread between the two entities. For example, a definitional function may indicate that a smartphone and a personal computer commonly share similar log-in credentials, and risk involving an individual's smartphone may suggest a significant amount of risk involving that individual's personal computer. A definitional function defining the relationship between two entities may indicate how the two entities may be used in conjunction. For example, a definitional function may specify that a security card may be used to access certain computers, but not others.

A definitional function defining the relationship between two entities may specify a degree of relationship between two entities. The degree of relationship may be qualitative or quantitative, and may merely provide the unsupervised machine learning model context. For example, a definitional function may specify how members of the same household may be related (e.g., a husband and wife are likely to share a personal computer, but two college roommates are unlikely to share the same smartphone). A quantitative characterization of a relationship between two entities may comprise a function, a quantity, or the like. For example, from a computing security perspective, the relationship between a husband and wife may be a larger integer than a relationship between next-door neighbors.

Definitional functions may be configured to define a class of entities and/or entity relationships. A class may define commonalities between various entities and/or entity relationships. A class may indicate, for example, that all smartphones have at least a MAC Address, but need not all have a headphone jack. A class may indicate that an individual may use a smartphone, but that a particular computer application may only be used by an individual via a computing device. The unsupervised machine learning model may be configured to make decisions in view of such classes. For example, an unsupervised machine learning model may determine that there is a difference in risk between transactions involving a first brand of smartphone and a second brand of smartphone, though each brand may manufacture a wide variety of smartphones.

A definitional function may be configured to avoid unwarranted correlations involving one or more entities. An unsupervised machine learning model may be prone to drawing unwarranted and/or undesirable correlations involving entities. For example, a large set of Internet hacking data fed into the unsupervised machine learning model may result in the unsupervised machine learning model drawing the conclusion that use of computers to access the Internet always results in fraud. Though such unwarranted and/or undesirable correlations may be avoided by providing a large variety of random data, in some instances such data may be difficult to provide. To avoid such unwarranted and/or undesirable correlations, the unsupervised machine learning model may, for example, be provided a definitional function that indicates that use of a computer on the Internet cannot, alone, comprise fraud, and/or an indication of a statistic (e.g., that only 0.1% of instances when a personal computer is used on the Internet are fraud).

A definitional function may indicate historical determinations about one or more entities or the relationship between entities. Such historical determinations need not be taken as fact by the unsupervised machine learning model, but may nonetheless provide guidance in decision-making. For example, a definitional function may indicate a frequency with which a certain type of smartphone is stolen in a certain geographic area. Such information could hint to the unsupervised machine learning model that it is more likely to find unauthorized use of a smartphone in that geographic area as compared with other geographic areas. As another example, a definitional function may indicate that unauthorized use of work computing devices regularly occurs after regular business hours. This may suggest to the unsupervised machine learning model that it is more likely to find instances of unauthorized use at, for example, nighttime.

An unsupervised machine learning model need not obey a definitional function or treat a definitional function as fact. For example, a definitional function may specify that chip-and-pin technology is safer than traditional magnetic stripe use with regard to a credit card, but the unsupervised machine learning model may determine that chip-and-pin use is less safe and more indicative of fraud. As another example, a definitional function may indicate that fraud commonly involves a first small transaction and a second large transaction, but the unsupervised learning algorithm may detect that fraud may instead indicate a large quantity of smaller transactions. As such, an unsupervised machine learning model may treat all input equally and/or provide some input more weight than other input, but need not treat any input as dispositive or absolute fact.

In additional to or alternatively to the definitional functions each entity in a given graph representation of one or more transactions may be associated with one or more machine learning models, such that the graph representation may be associated with a limitless number of machine learning models. Each machine learning model may be supervised and/or unsupervised and be configured in any of the manners described above. Each entity and/or class of entities may be associated with one or more machine learning models which may make decisions with regard to the graph and/or with regard to risk. For example, one entity may have a supervised machine learning model using a first set of definitional functions, whereas another entity may have an unsupervised machine learning model using a second set of definitional functions. As another example, a class of entities (e.g., video game consoles) may be associated with a first type of machine learning model, whereas a second class of entities (e.g., smartphones) may be associated with a set of machine learning models configured to operate in series and/or in parallel.

One or more machine learning models may be associated with one or more devices for use in conjunction with a computing device, e.g., removable storage media, security cards, or credit cards. A security card may have unique features which may be used at different times and in different transactions. For example, a security card may have Radio Frequency Identification (RFID) technology as well as a magnetic stripe. As such, the security card may be represented in a graph very differently: in one instance, the RFID technology may be used to open a door, whereas in another instance, the magnetic stripe may be used to entitle access a computing device Such different uses may have very different risk profiles: use of the RIFD technology to open a door may enable an individual to steal physical goods, whereas use of the magnetic stripe may enable an individual to exfiltrate digital data. As such, a first type of machine learning model may be associated with one form of use (e.g., the use of RFID), whereas a second type of machine learning model may be associated with a different form of use (e.g., use of a magnetic stripe).

One or more machine learning models may be associated with one or more individuals or a class of individuals. Profiles may be developed for different individuals, and corresponding machine learning models may be developed to represent these profiles. For example, a frequent traveler may have very different behavior than a college student. To account for these different behaviors, different machine learning models may be developed for one or more classes of individual such that characterizations may be analyzed in view of the particularities of such an individual. Different machine learning models may be developed for individuals in different geographical locations (e.g., countries). Different machine learning models may exist for different relationships of an individual to one or events (e.g., the player of a video game, the developer of a video game). A different machine learning model may be implemented based on the duration which an individual has been associated with another entity (e.g., how long a user has been employed by a company).

One or more machine learning models may be associated with one or more devices or a class of devices. Different computing devices may be involved with other entities in different ways: for example, a first computing device may access a second computing device and/or be accessed by the second computing device. As such, different machine learning models may be developed for different types of computing devices (e.g., smartphone, personal computer), different ways in which computing devices communicate (e.g., devices using cellular communications, devices using Ethernet cables), different ownership profiles of computing devices (e.g., public computers, workplace computers, personal computers located in a home), and the like.

Multiple machine learning models may be used together to make decisions. The output of one machine learning model may be used as the input of another machine learning model, and/or multiple machine learning models may execute in parallel, such that decision-making may comprise the use of a limitless number of machine learning models. For example, a graph representation involving four entities (a smartphone, a user, a second user, and a server) may involve four different machine learning models, each corresponding to a different entity an executing in parallel. A fifth machine learning model may be configured to analyze the output of the four machine learning models.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
    determining data corresponding to one or more graph representations of a first plurality of entities, wherein the one or more graph representations indicate a plurality of relationships between the first plurality of entities;
    training, for a first entity type, a first artificial neural network for machine learning executing on one or more first computing devices, wherein the first artificial neural network comprises a plurality of nodes, and wherein the plurality of nodes is configured based on a first portion of the data corresponding to the first entity type;
    training, for a second entity type, a second artificial neural network for machine learning executing on the one or more first computing devices, wherein the second artificial neural network comprises a second plurality of nodes, and wherein the second plurality of nodes is configured based on a second portion of the data corresponding to the second entity type;
    determining a first graph representation comprising a second plurality of entities, wherein the second plurality of entities comprises a first entity corresponding to the first entity type and a second entity corresponding to the second entity type; and
    receiving, from the first artificial neural network and the second artificial neural network and based on the first graph representation, output indicating a modification to a hotfile,
    wherein the hotfile comprises a dynamic graph structure representing risk associated with transaction data.

2. The method of claim 1, wherein each entity of the second plurality of entities is associated with a corresponding machine learning model.

3. The method of claim 1, further comprises determining a characterization of the first graph representation comprising:

transmitting output from the first artificial neural network and the second artificial neural network to a third artificial neural network; and receiving, from the third artificial neural network, the modification to the hotfile.

4. The method of claim 1, wherein the modification to the hotfile is based on historical hotfile data.

5. The method of claim 1, wherein the one or more graph representations are associated with one or more transactions between at least two entities of the first plurality of entities.

6. The method of claim 1, wherein after the modification to the hotfile, further comprising:

adding or removing a first entity of the first plurality of entities to the hotfile;

adding or removing a first relationship between two entities of the first plurality of entities to the hotfile; or modifying permissions of the hotfile associated with one or more entities of the first plurality of entities.

7. The method of claim 1, further comprising:

determining a transaction between at least two entities of the first plurality of entities; and causing, based on the hotfile, rejection of the transaction.

8. An apparatus comprising:

one or more processors; and memory storing instructions that, when executed by the one or more processors, cause the apparatus to:

determine data corresponding to one or more graph representations of a first plurality of entities, wherein the one or more graph representations indicate a plurality of relationships between the first plurality of entities;

train, for a first entity type, a first artificial neural network for machine learning executing on one or more first computing devices, wherein the first artificial neural network comprises a plurality of nodes, and wherein the plurality of nodes is configured based on a first portion of the data corresponding to the first entity type;

train, for a second entity type, a second artificial neural network for machine learning executing on the one or more first computing devices, wherein the second artificial neural network comprises a second plurality of nodes, and wherein the second plurality of nodes is configured based on a second portion of the data corresponding to the second entity type;

determine a first graph representation comprising a second plurality of entities, wherein the second plurality of entities comprises a first entity corresponding to the first entity type and a second entity corresponding to the second entity type; and receive, from the first artificial neural network and the second artificial neural network and based on the first graph representation, output indicating a modification to a hotfile, wherein the hotfile comprises a dynamic graph structure representing risk associated with transaction data.

9. The apparatus of claim 8, wherein each entity of the second plurality of entities is associated with a corresponding machine learning model.

10. The apparatus of claim 8, wherein the memory further stores instructions that, when executed by the one or more processors, cause the apparatus to:

determine a characterization of the first graph representation comprising:

transmitting output from the first artificial neural network and the second artificial neural network to a third artificial neural network; and receiving, from the third artificial neural network, the modification to the hotfile.

11. The apparatus of claim 8, wherein the modification to the hotfile is based on historical hotfile data.

12. The apparatus of claim 8, wherein the one or more graph representations are associated with one or more transactions between at least two entities of the first plurality of entities.

13. The apparatus of claim 8, wherein the memory further stores instructions that, when executed by the one or more processors, cause the apparatus to:

determine a transaction between at least two entities of the first plurality of entities; and cause, based on the hotfile, rejection of the transaction.

* * * * *